US009938908B2

(12) United States Patent
Li et al.

(10) Patent No.: US 9,938,908 B2
(45) Date of Patent: Apr. 10, 2018

(54) SYSTEM AND METHOD FOR PREDICTING A PEDAL POSITION BASED ON DRIVER BEHAVIOR AND CONTROLLING ONE OR MORE ENGINE ACTUATORS BASED ON THE PREDICTED PEDAL POSITION

(71) Applicant: GM Global Technology Operations LLC, Detroit, MI (US)

(72) Inventors: Shifang Li, Shelby Township, MI (US); Yue-Yun Wang, Troy, MI (US); Chen-Fang Chang, Bloomfield Hills, MI (US); Christopher E. Whitney, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/181,559

(22) Filed: Jun. 14, 2016

(65) Prior Publication Data

US 2017/0356350 A1 Dec. 14, 2017

(51) Int. Cl.
*G06F 19/00* (2018.01)
*F02D 11/02* (2006.01)

(52) U.S. Cl.
CPC ........ *F02D 11/02* (2013.01); *F02D 2200/602* (2013.01); *F02D 2200/701* (2013.01); *F02D 2200/702* (2013.01)

(58) Field of Classification Search
CPC ............... F02D 11/02; F02D 2200/702; F02D 2200/701; F02D 2200/602
See application file for complete search history.

(56) References Cited

U.S. PATENT DOCUMENTS

| | | | | |
|---|---|---|---|---|
| 4,161,929 | A | 7/1979 | Nohira et al. | |
| 4,653,449 | A | 3/1987 | Kamei et al. | |
| 4,823,266 | A | 4/1989 | Baltusis et al. | |
| 4,829,434 | A * | 5/1989 | Karmel | F16H 59/50 477/129 |
| 5,070,846 | A | 12/1991 | Dudek et al. | |
| 5,101,786 | A | 4/1992 | Kamio et al. | |
| 5,268,835 | A | 12/1993 | Miyagaki et al. | |
| 5,270,935 | A | 12/1993 | Dudek et al. | |

(Continued)

FOREIGN PATENT DOCUMENTS

| | | | |
|---|---|---|---|
| CN | 1594846 | A | 3/2005 |
| CN | 1702307 | A | 11/2005 |

(Continued)

OTHER PUBLICATIONS

Garrod, David, Ph.D. Esq., "Glossary of Judicial Claim Constructions in the Electronics, Computer and Business Method Arts", Public Patent Foundation, Inc., 2010, pp. 256-257.

(Continued)

*Primary Examiner* — David Hamaoui

(57) ABSTRACT

A system according to the principles of the present disclosure includes a pedal position prediction module and an engine actuator control module. The pedal position prediction module predicts a pedal position at a future time based on driver behavior and vehicle driving conditions. The pedal position includes at least one of an accelerator pedal position and a brake pedal position. The engine actuator control module controls an actuator of an engine based on the predicted pedal position.

20 Claims, 9 Drawing Sheets

(56) References Cited

U.S. PATENT DOCUMENTS 5,293,553 A 3/1994 Dudek et al.
5,347,446 A 9/1994 Iino et al.
5,357,932 A 10/1994 Clinton et al.
5,539,638 A 7/1996 Keeler et al.
5,568,388 A 10/1996 Schnerer et al.
5,609,136 A 3/1997 Tuken
5,620,393 A * 4/1997 Minowa ............... B60K 28/165 477/155
5,706,780 A 1/1998 Shirakawa
5,727,528 A 3/1998 Hori et al.
5,740,033 A 4/1998 Wassick et al.
5,775,293 A 7/1998 Kresse
5,794,171 A 8/1998 Bryant et al.
5,921,219 A 7/1999 Frohlich et al.
6,014,955 A 1/2000 Hosotani et al.
6,155,230 A 12/2000 Iwano et al.
6,487,459 B1 11/2002 Martin et al.
6,532,935 B2 3/2003 Ganser et al.
6,550,052 B1 4/2003 Joyce et al.
6,571,191 B1 5/2003 York et al.
6,606,981 B2 8/2003 Itoyama
6,619,261 B1 9/2003 Wang et al.
6,704,638 B2 3/2004 Livshiz et al.
6,714,852 B1 3/2004 Lorenz et al.
6,826,904 B2 12/2004 Miura
6,840,215 B1 1/2005 Livshiz et al.
6,871,136 B1 3/2005 Wang et al.
6,879,969 B2 * 4/2005 Engstrom ............ G05B 13/027 706/12
6,901,300 B2 5/2005 Blevins et al.
6,915,779 B2 * 7/2005 Sriprakash ............ F02D 11/106 123/361
6,925,372 B2 8/2005 Yasui
6,928,362 B2 8/2005 Meaney
6,962,550 B2 * 11/2005 Kadota .................... B60K 6/44 180/65.225
6,985,809 B2 1/2006 Yasui
6,990,858 B2 * 1/2006 Kerns ..................... B60T 13/52 701/30.7
7,016,779 B2 3/2006 Bowyer
7,021,282 B1 4/2006 Livshiz et al.
7,051,058 B2 5/2006 Wagner et al.
7,076,953 B2 7/2006 Kreso
H2182 H 2/2007 Freel et al.
7,225,782 B2 6/2007 Pallett et al.
7,274,986 B1 * 9/2007 Petridis ............... F02D 41/3076 123/295
7,275,374 B2 10/2007 Stewart et al.
7,328,577 B2 2/2008 Stewart et al.
7,360,615 B2 * 4/2008 Salman .................... B60K 6/52 180/65.265
7,369,934 B2 5/2008 Chatfield et al.
7,395,147 B2 7/2008 Livshiz et al.
7,400,967 B2 7/2008 Ueno et al.
7,418,372 B2 8/2008 Nishira et al.
7,433,775 B2 10/2008 Livshiz et al.
7,440,838 B2 10/2008 Livshiz et al.
7,441,544 B2 10/2008 Hagari
7,467,614 B2 * 12/2008 Stewart ............... F02D 41/0007 123/198 F
7,472,692 B2 1/2009 Nakagawa et al.
7,594,496 B2 * 9/2009 Frenz ................ B60W 30/1882 123/351
7,596,446 B1 9/2009 Sakayanagi et al.
7,614,384 B2 11/2009 Livshiz et al.
7,650,219 B2 1/2010 Livshiz et al.
7,650,225 B2 1/2010 Nakagawa et al.
7,703,439 B2 4/2010 Russell et al.
7,715,975 B2 5/2010 Yamaoka et al.
7,775,195 B2 8/2010 Schondorf et al.
7,783,409 B2 8/2010 Kang et al.
7,813,869 B2 10/2010 Grichnik et al.
7,835,835 B2 * 11/2010 Wakiyama ............. B60H 1/005 701/36
7,885,756 B2 2/2011 Livshiz et al.
7,941,260 B2 5/2011 Lee et al.
7,967,720 B2 6/2011 Martin et al.
8,032,235 B2 10/2011 Sayyar-Rodsari
8,041,487 B2 10/2011 Worthing et al.
8,050,841 B2 11/2011 Costin et al.
8,073,610 B2 12/2011 Heap et al.
8,103,425 B2 1/2012 Choi et al.
8,103,428 B2 1/2012 Russ et al.
8,116,954 B2 2/2012 Livshiz et al.
8,176,735 B2 5/2012 Komatsu
8,185,217 B2 5/2012 Thiele
8,225,293 B2 7/2012 Correa
8,241,177 B2 8/2012 Doering et al.
8,255,139 B2 8/2012 Whitney et al.
8,265,854 B2 9/2012 Stewart et al.
8,307,814 B2 11/2012 Leroy et al.
8,316,827 B2 11/2012 Miyamoto et al.
8,332,090 B2 * 12/2012 Rutquist .................. B60K 6/48 701/22
8,346,447 B2 1/2013 Baur et al.
8,360,040 B2 1/2013 Stewart et al.
8,406,954 B2 3/2013 Whitney et al.
8,447,492 B2 5/2013 Watanabe et al.
8,468,821 B2 6/2013 Liu et al.
8,483,935 B2 7/2013 Whitney et al.
RE44,452 E 8/2013 Stewart et al.
8,504,175 B2 * 8/2013 Pekar ................... G05B 13/048 700/12
8,560,204 B2 10/2013 Simon, Jr. et al.
8,566,002 B2 10/2013 Livshiz et al.
8,572,961 B2 11/2013 Karnik et al.
8,594,904 B2 11/2013 Livshiz et al.
8,739,766 B2 6/2014 Jentz et al.
8,760,003 B2 6/2014 Imura et al.
8,786,421 B2 * 7/2014 Dozza ...................... B60Q 1/44 340/468
8,862,248 B2 10/2014 Yasui
8,954,257 B2 2/2015 Livshiz et al.
9,052,997 B2 6/2015 Ono
9,062,631 B2 6/2015 Kinugawa et al.
9,075,406 B2 7/2015 Nakada
9,108,629 B2 * 8/2015 Otake ................... B60W 20/00
9,127,614 B2 9/2015 Ueno et al.
9,145,841 B2 9/2015 Miyazaki et al.
9,175,628 B2 11/2015 Livshiz et al.
9,180,408 B2 * 11/2015 Perry ................. B01D 53/9477
9,222,443 B2 12/2015 Peters et al.
9,243,524 B2 1/2016 Whitney et al.
9,284,902 B2 * 3/2016 Keller ................. F02D 41/0215
9,328,671 B2 5/2016 Whitney et al.
9,334,815 B2 5/2016 Cygan, Jr. et al.
9,361,272 B2 * 6/2016 Syed ...................... B60K 6/445
9,388,754 B2 * 7/2016 Cygan, Jr. ............. B60W 10/06
9,388,758 B2 * 7/2016 Pochner .................. F02D 41/04
9,399,959 B2 7/2016 Whitney et al.
9,569,984 B2 * 2/2017 Stankoulov .......... G09B 19/167
9,616,771 B2 * 4/2017 Grossard ............. B60L 15/2045
2001/0017126 A1 8/2001 Kowatari et al.
2002/0038647 A1 4/2002 Tashiro et al.
2002/0078924 A1 6/2002 Yagi
2002/0124832 A1 9/2002 Oota et al.
2002/0128116 A1 9/2002 Idogawa et al.
2002/0179050 A1 12/2002 Soliman et al.
2003/0028265 A1 2/2003 Martin
2003/0074892 A1 4/2003 Miura
2003/0110760 A1 6/2003 Shirakawa
2003/0145836 A1 8/2003 Linna et al.
2003/0177765 A1 9/2003 Wang
2003/0216856 A1 11/2003 Jacobson
2004/0102890 A1 5/2004 Brunell
2004/0107034 A1 6/2004 Togai et al.
2004/0116220 A1 6/2004 Yamamoto et al.
2004/0123600 A1 7/2004 Brunell et al.
2005/0065691 A1 3/2005 Cho
2005/0131620 A1 6/2005 Bowyer
2005/0149209 A1 7/2005 Wojsznis et al.
2005/0166900 A1 8/2005 Song et al.
2005/0171670 A1 8/2005 Yoshioka et al.

(56) References Cited

U.S. PATENT DOCUMENTS

| | | | | |
|---|---|---|---|---|
| 2005/0193739 | A1 | 9/2005 | Brunell et al. | |
| 2005/0204726 | A1 | 9/2005 | Lewis | |
| 2005/0228573 | A1 | 10/2005 | Gangopadhyay | |
| 2005/0267608 | A1 | 12/2005 | Nishira et al. | |
| 2006/0113799 | A1 | 6/2006 | Obayashi et al. | |
| 2006/0137335 | A1 | 6/2006 | Stewart et al. | |
| 2006/0137340 | A1 | 6/2006 | Stewart | |
| 2006/0199699 | A1 | 9/2006 | Berglund et al. | |
| 2006/0212140 | A1 | 9/2006 | Brackney | |
| 2007/0068159 | A1 | 3/2007 | Ueno et al. | |
| 2007/0174003 | A1 | 7/2007 | Ueno et al. | |
| 2007/0276512 | A1 | 11/2007 | Fan et al. | |
| 2008/0120009 | A1 | 5/2008 | Livshiz et al. | |
| 2008/0127938 | A1 | 6/2008 | Hagari | |
| 2008/0271718 | A1 | 11/2008 | Schondorf et al. | |
| 2008/0276913 | A1 | 11/2008 | Zubeck | |
| 2008/0308066 | A1 | 12/2008 | Martin et al. | |
| 2009/0018733 | A1 | 1/2009 | Livshiz et al. | |
| 2009/0033264 | A1 | 2/2009 | Falkenstein | |
| 2009/0037066 | A1 | 2/2009 | Kuwahara et al. | |
| 2009/0037073 | A1 | 2/2009 | Jung et al. | |
| 2009/0118968 | A1 | 5/2009 | Livshiz et al. | |
| 2009/0118969 | A1 | 5/2009 | Heap et al. | |
| 2009/0118972 | A1 | 5/2009 | Baur et al. | |
| 2009/0143959 | A1 | 6/2009 | Yamaoka et al. | |
| 2009/0182484 | A1 | 7/2009 | Loeffler et al. | |
| 2009/0216935 | A1* | 8/2009 | Flick | B60R 16/037 711/103 |
| 2009/0229562 | A1 | 9/2009 | Ramappan et al. | |
| 2009/0292435 | A1 | 11/2009 | Costin et al. | |
| 2010/0049419 | A1 | 2/2010 | Yoshikawa et al. | |
| 2010/0057283 | A1 | 3/2010 | Worthing et al. | |
| 2010/0057329 | A1 | 3/2010 | Livshiz et al. | |
| 2010/0075803 | A1 | 3/2010 | Sharples et al. | |
| 2010/0100248 | A1 | 4/2010 | Minto et al. | |
| 2010/0116249 | A1 | 5/2010 | Guerrassi et al. | |
| 2010/0116250 | A1 | 5/2010 | Simon, Jr. et al. | |
| 2010/0180876 | A1 | 7/2010 | Leroy et al. | |
| 2010/0211294 | A1 | 8/2010 | Soejima | |
| 2010/0222982 | A1 | 9/2010 | Wang et al. | |
| 2010/0241335 | A1 | 9/2010 | Aso | |
| 2010/0263627 | A1 | 10/2010 | Whitney et al. | |
| 2010/0268436 | A1 | 10/2010 | Soejima et al. | |
| 2010/0280738 | A1 | 11/2010 | Whitney et al. | |
| 2011/0034298 | A1 | 2/2011 | Doering et al. | |
| 2011/0045948 | A1 | 2/2011 | Doering et al. | |
| 2011/0066308 | A1 | 3/2011 | Yang et al. | |
| 2011/0082629 | A1 | 4/2011 | Soejima et al. | |
| 2011/0087421 | A1 | 4/2011 | Soejima et al. | |
| 2011/0100013 | A1 | 5/2011 | Whitney et al. | |
| 2011/0113773 | A1 | 5/2011 | Liu et al. | |
| 2011/0126390 | A1 | 5/2011 | Bellinger et al. | |
| 2011/0144838 | A1 | 6/2011 | Matthews et al. | |
| 2011/0225967 | A1 | 9/2011 | Karnik et al. | |
| 2011/0257789 | A1 | 10/2011 | Stewart et al. | |
| 2011/0264353 | A1 | 10/2011 | Atkinson et al. | |
| 2012/0065864 | A1 | 3/2012 | Whitney et al. | |
| 2012/0078468 | A1 | 3/2012 | Popp et al. | |
| 2012/0145123 | A1 | 6/2012 | Ono | |
| 2012/0150399 | A1 | 6/2012 | Kar et al. | |
| 2012/0203434 | A1 | 8/2012 | Sujan et al. | |
| 2012/0204832 | A1 | 8/2012 | Baur et al. | |
| 2012/0209493 | A1 | 8/2012 | Miyata et al. | |
| 2012/0221301 | A1 | 8/2012 | Umeda et al. | |
| 2012/0296557 | A1 | 11/2012 | Ramappan et al. | |
| 2013/0032123 | A1 | 2/2013 | Kinugawa et al. | |
| 2013/0032127 | A1 | 2/2013 | Jentz et al. | |
| 2013/0060448 | A1 | 3/2013 | Nakada | |
| 2013/0080023 | A1 | 3/2013 | Livshiz et al. | |
| 2013/0104859 | A1 | 5/2013 | Miyazaki et al. | |
| 2013/0151124 | A1 | 6/2013 | Seiberlich et al. | |
| 2013/0184961 | A1 | 7/2013 | Kumar et al. | |
| 2013/0213353 | A1 | 8/2013 | Rollinger et al. | |
| 2013/0255625 | A1 | 10/2013 | Kar et al. | |
| 2014/0076279 | A1 | 3/2014 | Livshiz et al. | |
| 2014/0081559 | A1 | 3/2014 | Kar | |
| 2014/0123938 | A1 | 5/2014 | Whitney et al. | |
| 2014/0174413 | A1 | 6/2014 | Huang et al. | |
| 2014/0174414 | A1 | 6/2014 | Huang et al. | |
| 2014/0238344 | A1 | 8/2014 | Douglas | |
| 2014/0311446 | A1 | 10/2014 | Whitney et al. | |
| 2014/0316681 | A1 | 10/2014 | Whitney et al. | |
| 2014/0316682 | A1 | 10/2014 | Whitney et al. | |
| 2014/0316683 | A1 | 10/2014 | Whitney et al. | |
| 2015/0006064 | A1* | 1/2015 | Dextreit | F02N 11/0822 701/112 |
| 2015/0039206 | A1 | 2/2015 | Storch et al. | |
| 2015/0105991 | A1 | 4/2015 | Uhlirsch et al. | |
| 2015/0253749 | A1 | 9/2015 | Kniazev et al. | |
| 2015/0275569 | A1 | 10/2015 | LeBlanc | |
| 2015/0275711 | A1 | 10/2015 | Whitney et al. | |
| 2015/0275771 | A1* | 10/2015 | Pochner | F02D 9/02 701/103 |
| 2015/0275772 | A1 | 10/2015 | Long et al. | |
| 2015/0275783 | A1 | 10/2015 | Wong et al. | |
| 2015/0275784 | A1 | 10/2015 | Whitney et al. | |
| 2015/0275785 | A1 | 10/2015 | Cygan, Jr. et al. | |
| 2015/0275786 | A1 | 10/2015 | Jin et al. | |
| 2015/0275789 | A1 | 10/2015 | Cygan, Jr. et al. | |
| 2015/0275792 | A1 | 10/2015 | Genslak et al. | |
| 2015/0275794 | A1 | 10/2015 | Verdejo et al. | |
| 2015/0275795 | A1 | 10/2015 | Cygan, Jr. et al. | |
| 2015/0275796 | A1 | 10/2015 | Pochner et al. | |
| 2015/0275806 | A1 | 10/2015 | Genslak et al. | |
| 2015/0361915 | A1 | 12/2015 | Sujan et al. | |
| 2015/0369146 | A1 | 12/2015 | Zavala Jurado et al. | |
| 2016/0025028 | A1 | 1/2016 | Vaughan | |
| 2016/0101728 | A1* | 4/2016 | Chan | B60Q 9/00 340/447 |
| 2016/0108798 | A1* | 4/2016 | VanDerWege | F02D 41/0087 60/602 |
| 2016/0131061 | A1 | 5/2016 | Whitney et al. | |
| 2016/0214599 | A1* | 7/2016 | Doering | B60W 30/19 |
| 2016/0216699 | A1* | 7/2016 | Pekar | F02D 29/02 |
| 2016/0237927 | A1 | 8/2016 | Long et al. | |
| 2016/0237932 | A1 | 8/2016 | Long et al. | |

FOREIGN PATENT DOCUMENTS

| | | | |
|---|---|---|---|
| CN | 102094721 | A | 6/2011 |
| CN | 103016177 | | 4/2013 |
| JP | 2005050000 | A | 2/2005 |
| WO | WO-03-065135 | A1 | 8/2003 |

OTHER PUBLICATIONS

U.S. Appl. No. 13/686,069, filed Nov. 27, 2012, Livshiz et al.
U.S. Appl. No. 13/911,121, filed Jun. 6, 2013, Whitney et al.
U.S. Appl. No. 13/911,132, filed Jun. 6, 2013, Whitney et al.
U.S. Appl. No. 13/911,148, filed Jun. 6, 2013, Whitney et al.
U.S. Appl. No. 13/911,156, filed Jun. 6, 2013, Whitney et al.
U.S. Appl. No. 14/032,508, filed Sep. 20, 2013, Storch et al.
U.S. Appl. No. 14/225,492, filed Mar. 26, 2014, Wong et al.
U.S. Appl. No. 14/225,496, filed Mar. 26, 2014, Pochner et al.
U.S. Appl. No. 14/225,502, filed Mar. 26, 2014, Long et al.
U.S. Appl. No. 14/225,507, filed Mar. 26, 2014, Jin et al.
U.S. Appl. No. 14/225,516, filed Mar. 26, 2014, Whitney et al.
U.S. Appl. No. 14/225,531, filed Mar. 26, 2014, Genslak et al.
U.S. Appl. No. 14/225,569, filed Mar. 26, 2014, Long et al.
U.S. Appl. No. 14/225,587, filed Mar. 26, 2014, Cygan Jr. et al.
U.S. Appl. No. 14/225,626, filed Mar. 26, 2014, Verdejo et al.
U.S. Appl. No. 14/225,808, filed Mar. 26, 2014, Whitney et al.
U.S. Appl. No. 14/225,817, filed Mar. 26, 2014, Cygan Jr. et al.
U.S. Appl. No. 14/225,891, filed Mar. 26, 2014, Genslak et al.
U.S. Appl. No. 14/225,896, filed Mar. 26, 2014, Cygan Jr. et al.
U.S. Appl. No. 14/226,006, filed Mar. 26, 2014, Pochner et al.
U.S. Appl. No. 14/226,121, filed Mar. 26, 2014, Wong et al.
U.S. Appl. No. 14/309,047, filed Jun. 19, 2014, Zavala Jurado et al.
U.S. Appl. No. 14/617,068, filed Feb. 9, 2015, Whitney et al.
U.S. Appl. No. 14/675,828, filed Apr. 1, 2015, Long et al.

(56) References Cited

OTHER PUBLICATIONS

U.S. Appl. No. 14/675,860, filed Apr. 1, 2015, Long et al.
U.S. Appl. No. 14/931,134, filed Nov. 3, 2015, Wong et al.
U.S. Appl. No. 13/613,588, filed Sep. 13, 2012, Livshiz et al.
U.S. Appl. No. 13/613,683, filed Sep. 13, 2012, Livshiz et al.
U.S. Appl. No. 14/309,047, filed Jun. 19, 2014, Jose C. Zavala Jurado et al.
Y. Tian ; Department of Aerospace Engineering, the University of Michigan, Ann Arbor, United States; S. Li ; Y.-Y. Wang ; I. V. Kolmanovsky; "Risk prediction and its use for control of constrained systems with disturbances"; Published in 2015; American Control Conference (ACC); Chicago, IL USA; Jul. 1-3, 2015; pp. 2987-2992.
Kolmanovsky, I., "Towards Engine and Powertrain Control Based on Model Predictive Control," (Sep. 28, 2012), Powerpoint Presentation, 47 slides.
John C. G. Boot; "Quadratic Programming: Algorithms, Anomalies, Applications Volume 2 of Studies in mathematical and managerial economics"; North-Holland Publ.Comp., 1964; 213 pages.
N. Lawrence Ricker; "Use of quadratic programming for constrained internal model control"; Ind. Eng. Chem. Process Des. Dev., 1985, pp. 925-936.
C. E. Lemke; "A Method of Solution for Quadratic Programs"; Rensselaer Polytechnic Institute, Troy, New York, Published Online: Jul. 1, 1962, pp. 442-453.
First Office Action for Chinese Application No. 201510136174.5 dated Jan. 24, 2017 with English translation; 9 pages.

* cited by examiner

SYSTEM AND METHOD FOR PREDICTING A PEDAL POSITION BASED ON DRIVER BEHAVIOR AND CONTROLLING ONE OR MORE ENGINE ACTUATORS BASED ON THE PREDICTED PEDAL POSITION

FIELD

The present disclosure relates to internal combustion engines, and more specifically, to systems and methods for predicting a pedal position based on driver behavior and controlling one or more engine actuators based on the predicted pedal position.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a pedal position prediction module and an engine actuator control module. The pedal position prediction module predicts a pedal position at a future time based on driver behavior and vehicle driving conditions. The pedal position includes at least one of an accelerator pedal position and a brake pedal position. The engine actuator control module controls an actuator of an engine based on the predicted pedal position.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
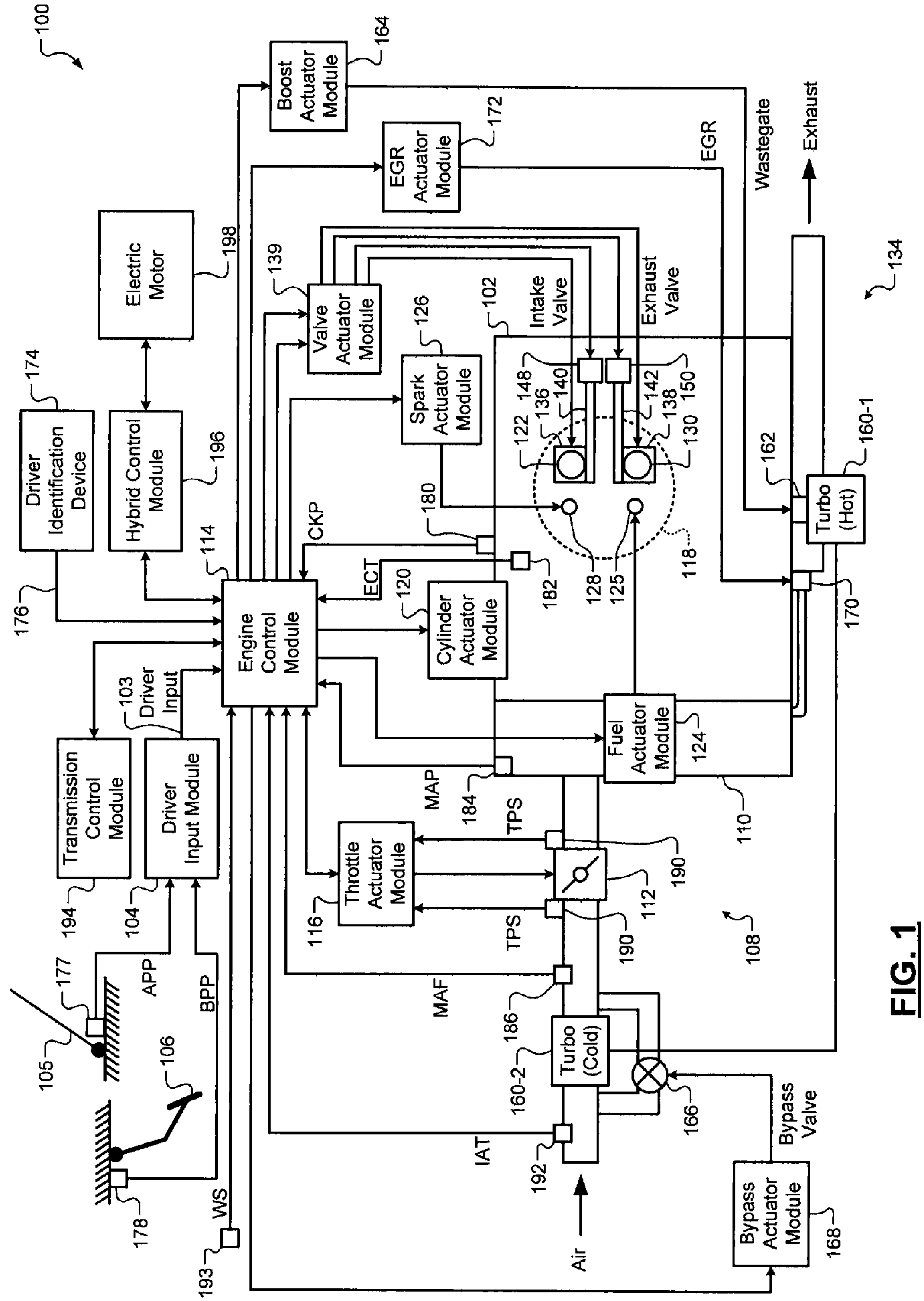
FIG. 1 is a functional block diagram of an example vehicle system according to the present disclosure.

An engine control module (ECM) controls the torque output of an engine. More specifically, the ECM determines target values for actuators of the engine based on a requested amount of torque, and controls the actuators of the engine based on the target values. For example, the ECM controls intake and exhaust valve lift based on target intake and exhaust valve lift states, controls a throttle valve based on a target throttle opening, and controls a wastegate of a turbocharger based on a target wastegate duty cycle.

The ECM could determine the target values individually using multiple single input single output (SISO) controllers, such as proportional integral derivative (PID) controllers. However, when multiple SISO controllers are used, the target values may be set to maintain system stability at the expense of possible decreases in fuel consumption. Additionally, calibration and design of the individual SISO controllers may be costly and time consuming.

The ECM of the present disclosure generates the target values using a model predictive control (MPC) module. The MPC module identifies possible sets of target values based on an engine torque request. The MPC module predicts responses of the engine for each of the possible sets based on the possible sets target values and a mathematical model of the engine. In one example, the MPC module predicts the torque output of the engine, the pressure within the intake manifold of the engine, and the amount of air provided to each cylinder of the engine.

The MPC module may also determine a cost associated with use of each of the possible sets. The cost determined for a possible set may increase as differences between the target values of the possible set and reference values increase and vice versa. The MPC module may also apply weighting values to the differences between the target values of the possible set and reference values to adjust how much each of these differences affects the cost. The MPC module may select the possible set that has the lowest cost. Instead of or in addition to identifying possible sets of target values and determining the cost of each of the sets, the MPC module may generate a surface representing the cost of possible sets of target values. The MPC module may then identify the possible set that has the lowest cost based on the slope of the cost surface.

The MPC module may determine whether the predicted responses of the selected set satisfy constraints. If so, the MPC module may set the target values based on the selected set. Otherwise, the MPC module may select the possible set having the next lowest cost and test that set for satisfaction of the constraints. The process of selecting a set and testing the set for satisfaction of the constraints may be referred to as an iteration. Multiple iterations may be performed during each control loop.

Instead of or in addition to determining whether the predicted torque output of the engine satisfies a constraint, the MPC module may determine the cost associated with use of each of the possible sets based on differences between the predicted torque output and a torque request. In one example, the ECM determines the torque request based on a driver input such as an accelerator pedal position and/or a brake pedal position. Since the driver input is dependent on decisions made by the driver, future values of the driver input are unknown. Therefore, the MPC module could assume that the torque request remains constant in the prediction horizon. However, this assumption may be incorrect, which may degrade the performance of the engine.

An ECM according to the present disclosure overcomes this challenge by predicting the driver input based on the driving style or past driving behavior of the driver, and predicting the torque request based on the predicted driver input. The MPC module may then determine the cost associated with use of a possible set of target values for an engine actuator based on differences between the predicted torque output and the predicted torque request. In one example, the ECM identifies the driver and predicts the driver input based on current driver input, vehicle driving conditions, and the driver identification. In another example, the ECM develops a model that relates driver behavior data to the vehicle driving conditions and the driver identification, and predicts the driver input based on the vehicle driving conditions and the driver identification using the model.

The driver behavior data includes a history of the driver input and the corresponding vehicle driving conditions and driver identification. To save memory and computation costs, the ECM may transmit the driver behavior data to a remote server (e.g., in the cloud), which may store the driver behavior data. The ECM may then retrieve the driver behavior data from the cloud when the current driver identification matches the driver identification associated with the driver behavior data.

Predicting the driver input and determining future values of a torque request rather than assuming that the torque request remains constant may improve the engine performance (e.g., fuel economy and drivability). In addition, predicting the driver input based on the style of a particular driver has benefits outside of MPC. For example, determining future torque requests and/or future target values of an engine actuator based on a predicted driver input may improve engine performance regardless of whether an engine is controlled using a SISO controller or an MPC control module.

Referring now to FIG. 1, a vehicle system 100 includes an engine 102 that combusts an air/fuel mixture to produce drive torque for a vehicle. The amount of drive torque produced by the engine 102 is based on a driver input 103 from a driver input module 104. The driver input 103 may be based on a position of an accelerator pedal 105 and/or a position of a brake pedal 106. The driver input 103 may also be based on a cruise control system (not shown), which may be an adaptive cruise control system that varies vehicle speed to maintain a predetermined following distance.

Air is drawn into the engine 102 through an intake system 108. The intake system 108 includes an intake manifold 110 and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. A cylinder actuator module 120 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injections performed by a fuel injector 125 to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a spark timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 is actuated using an intake valve actuator 136, while the exhaust valve 130 is actuated using an exhaust valve actuator 138. A valve actuator module 139 may control the intake and exhaust valve actuators 136 and 138 based on signals from the ECM 114. In various implementations, the intake valve actuator 136 may actuate multiple intake valves (including the intake valve 122) of the cylinder 118. Similarly, the exhaust valve actuator 138 may actuate multiple exhaust valves (including the exhaust valve 130) of the cylinder 118. Additionally, a single valve actuator may actuate one or more exhaust valves of the cylinder 118 and one or more intake valves of the cylinder 118. Further, the intake valve actuator 136 may actuate multiple intake valves of multiple cylinders, and the exhaust valve actuator 138 may actuate multiple exhaust valves of multiple cylinders.

In various implementations, the intake valve actuator 136 may be driven by an intake camshaft 140, and the exhaust valve actuator 138 may be driven by an exhaust camshaft 142. For example, the intake valve actuator 136 may include a rocker arm and a cam follower coupled to the rocker arm. The rocker arm may lift the intake valve 122 from its valve seat when the cam follower engages a lobe on the intake camshaft 140. Similarly, the exhaust valve actuator 138 may include a rocker arm and a cam follower coupled to the rocker arm. The rocker arm may lift the exhaust valve 130 from its valve seat when the cam follower engages a lobe on the exhaust camshaft 142.

In other implementations, the intake and exhaust valve actuators 136 and 138 may actuate the intake and exhaust valves 122 and 130 independent of a camshaft. For example, the intake and exhaust valves 122 and 130 may be electromagnetic or electrohydraulic valve actuators. In these implementations, the intake and exhaust valve actuators 136 and 138 may be referred to as camless valve actuators.

The intake and exhaust valve actuators 136 and 138 may vary the amount by which the intake and exhaust valves 122 and 130 are lifted from their respective valve seats. For example, the intake and exhaust valve actuators 136 and 138 may switch between a first lift state and a second lift state. The intake and exhaust valve actuators 136 and 138 may cause the intake and exhaust valves 122 and 130 to lift from their respective valve seats by a first amount when operating in the first lift state. The intake and exhaust valve actuators 136 and 138 may cause the intake and exhaust valves 122 and 130 to lift from their respective valve seats by a second amount when operating in the second lift state. The first and second amounts may be predetermined, nonzero values. In addition, the second amount may be greater than the first amount. In this regard, the first lift state may be referred to as a low lift state, and the second lift state may be referred to as a high lift state.

When the intake and exhaust valve actuators 136 and 138 are cam driven, each of the intake and exhaust valve actuators 136 and 138 may include a cam follower having a height that is adjustable to vary the lift of the intake and exhaust valves 122 and 130. Alternatively, each of the intake and exhaust valve actuators 136 and 138 may include a solenoid that translates a camshaft segment along the length of one of the camshafts 140 and 142 to cause a cam follower to engage different lobes on the camshaft segment. The lobes may have different heights so that switching which one of the lobes the cam follower engages varies the lift of the intake and exhaust valves 122 and 130. Valve actuators such as these may be referred to as sliding cam actuators.

When the intake and exhaust valve actuators 136 and 138 are camless valve actuators, the valve actuators 136 and 138 may also adjust the timing of the intake and exhaust valves 122 and 130, respectively. When the intake and exhaust valve actuators 136 and 138 are cam driven, the timing of the intake and exhaust valves 122 and 130 may be adjusted by intake and exhaust cam phasers 148, 150, respectively. The valve actuator module 139 may adjust the position of the intake and exhaust cam phasers 148, 150 based on signals received from the ECM 114.

The cylinder actuator module 120 may deactivate the cylinder 118 by instructing the valve actuator module 139 to disable opening of the intake valve 122 and/or the exhaust valve 130. When the intake valve actuator 136 is cam driven, the intake valve actuator 136 may disable opening of the intake valve 122 by decoupling the intake valve 122 from the intake camshaft 140. Similarly, when the exhaust valve actuator 138 is cam driven, the exhaust valve actuator 138 may disable opening of the exhaust valve 130 by decoupling the exhaust valve 130 from the exhaust camshaft 142.

In various implementations, the valve actuator module 139 may disable opening of the intake and exhaust valves 122 and 130 by switching the intake and exhaust valve actuators 136 and 138 to a third lift state. The intake and exhaust valve actuators 136 and 138 may lift the intake and exhaust valves 122 and 130 from their respective valve seats by a third amount when operating in the third lift state. The third amount may be zero. Thus, the third lift state may be referred to as a zero lift state.

The vehicle system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, which compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust. A bypass valve 166 may allow exhaust to bypass the compressor 160-2 when the bypass valve 166 is open. The ECM 114 may control the bypass valve 166 via a bypass actuator module 168.

The exhaust system 134 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The vehicle system 100 may include a driver identification device 174 that generate a driver identification signal 176 indicating the identification of a driver of the vehicle. In one example, the driver identification device 174 includes a camera that is aimed at the driver's seat to generate an image of the driver when, for example, the driver enters the vehicle. The driver identification device 174 may further include image recognition software that identifies the driver based on the image generated by the camera. In another example, the driver identification device 174 includes a touchscreen that requests the driver to enter their identification by manipulating the touchscreen when, for example, the driver enters the vehicle.

In yet another example, the driver identification device 174 identifies the driver by communicating with a key fob (not shown). The driver identification device 174 may assume that only one driver uses the key fob, or the key fob may be programmable to associate the driver therewith. The driver identification device 174 may communicate with the key fob using, for example, radio frequency (RF) and/or bluetooth signals.

The vehicle system 100 may measure the position of the accelerator pedal 105 using an accelerator pedal position (APP) sensor 177. The position of the brake pedal 106 may be measured using a brake pedal position (BPP) sensor 178. The APP sensor 177 and the BPP sensor 178 may output the accelerator pedal position and the brake pedal position, respectively, to the driver input module 104 and/or the ECM 114.

The position of the crankshaft may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The rotational speed of one or more wheels (not shown) of the vehicle may be measured using one or more wheel speed (WS) sensors 193. The ECM 114 uses signals from the sensors to make control decisions for the vehicle system 100.

The ECM 114 may communicate with a transmission control module (TCM) 194 to coordinate shifting gears in a transmission (not shown). For example, the ECM 114 may reduce engine torque during a gear shift. The ECM 114 may communicate with a hybrid control module (HCM) 196 to coordinate operation of the engine 102 and an electric motor 198. The electric motor 198 may also function as a generator, and may be used to produce electrical energy for use by the vehicle's electrical systems and/or for storage in a battery. In various implementations, various functions of the ECM 114, the TCM 194, and the HCM 196 may be integrated into one or more modules.

Figure 2:
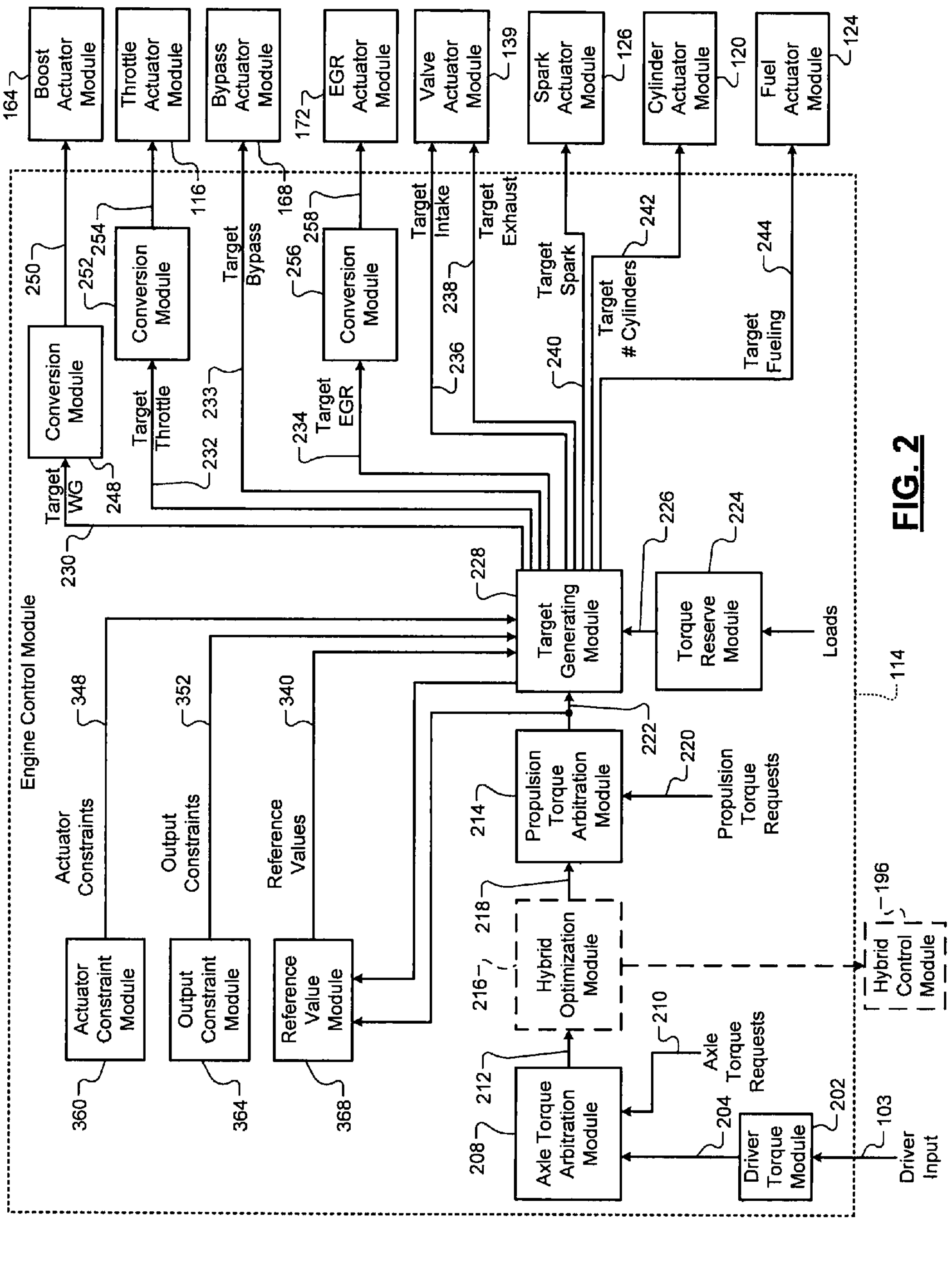
FIG. 2 is a functional block diagram of an example engine control system according to the present disclosure.

Referring now to FIG. 2, an example implementation of the ECM 114 includes a drive torque module 202. The driver torque module 202 determines a driver torque request 204 based on the driver input 103 from the driver input module 104. The driver torque module 202 may store one or more mappings of accelerator pedal position and/or brake pedal position to target torque and may determine the driver torque request 204 based on a selected one of the mappings. The driver torque module 202 may determine a first target torque based on the accelerator pedal position, determines a second target torque based on the brake pedal position, and set the driver torque request 204 equal to a sum of the first and second target torques.

The driver torque request 204 may be zero or have a positive value when the driver torque request 204 is determined based on the accelerator pedal position. The driver torque request 204 may be zero or have a negative value when the driver torque request 204 is determined based on the brake pedal position. If the driver torque request 204 is determined based on both the accelerator pedal position and the brake pedal position, the driver torque request 204 may be zero or have a positive or negative value.

The driver torque request 204 may include a current driver torque request and future driver torque requests. The driver torque module 202 may determine the current driver torque request based on a current pedal position such as the accelerator pedal position from the APP sensor 177 and/or the brake pedal position from the BPP sensor 178. In addition, the driver torque module 202 may predict a pedal position based on the current pedal position, vehicle driving conditions, and driver behavior, and determine the future driver torque requests based on the predicted pedal position.

An axle torque arbitration module 208 arbitrates between the driver torque request 204 and other axle torque requests 210. Axle torque (torque at the wheels) may be produced by various sources including an engine and/or an electric motor. For example, the axle torque requests 210 may include a torque reduction requested by a traction control system when positive wheel slip is detected. Positive wheel slip occurs when axle torque overcomes friction between the wheels and the road surface, and the wheels begin to slip against the road surface. The axle torque requests 210 may also include a torque increase request to counteract negative wheel slip, where a tire of the vehicle slips in the other direction with respect to the road surface because the axle torque is negative.

The axle torque requests 210 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 210 may also be generated by vehicle stability control systems.

The axle torque arbitration module 208 outputs an axle torque request 212 based on the results of arbitrating between the received axle torque requests 204 and 210. As described below, the axle torque request 212 from the axle torque arbitration module 208 may selectively be adjusted by other modules of the ECM 114 before being used to control the engine actuators.

The axle torque arbitration module 208 may output the axle torque request 212 to a propulsion torque arbitration module 214. In various implementations, the axle torque arbitration module 208 may output the axle torque request 212 to a hybrid optimization module 216. The hybrid optimization module 216 may determine how much torque should be produced by the engine 102 and how much torque should be produced by the electric motor 198. The hybrid optimization module 216 then outputs a modified axle torque request 218 to the propulsion torque arbitration module 214.

The propulsion torque arbitration module 214 converts the axle torque request 212 (or the modified axle torque request 218) from an axle torque domain (torque at the wheels) into a propulsion torque domain (torque at the crankshaft). The propulsion torque arbitration module 214 arbitrates between the (converted) axle torque request 212 and other propulsion torque requests 220. The propulsion torque arbitration module 214 generates a propulsion torque request 222 as a result of the arbitration.

For example, the propulsion torque requests 220 may include torque reductions for engine over-speed protection, torque increases for stall prevention, and torque reductions to accommodate transmission gear shifts. The propulsion torque requests 220 may also result from clutch fuel cutoff, which reduces the engine output torque when the driver depresses the clutch pedal in a manual transmission vehicle to prevent a flare in engine speed.

The propulsion torque requests 220 may also include an engine shutoff request, which may be initiated when a critical fault is detected. For example, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 214 may output zero as the propulsion torque request 222.

In various implementations, an engine shutoff request may simply shut down the engine 102 separately from the arbitration process. The propulsion torque arbitration module 214 may still receive the engine shutoff request so that, for example, appropriate data can be fed back to other torque requestors. For example, all other torque requestors may be informed that they have lost arbitration.

A torque reserve module 224 generates a torque reserve 226 to compensate for changes in engine operating conditions that may decrease engine output torque and/or to compensate for one or more loads. For example, the air/fuel ratio of the engine 102 and/or the mass air flow may be directly varied, such as by diagnostic intrusive equivalence ratio testing and/or new engine purging. Before beginning these processes, the torque reserve module 224 may create or increase the torque reserve 226 to quickly offset decreases in engine output torque that result from leaning the air/fuel mixture during these processes.

The torque reserve module 224 may also create or increase the torque reserve 226 in anticipation of a future load, such as power steering pump operation or engagement of an air conditioning (A/C) compressor clutch. The torque reserve module 224 may create or increase the torque reserve 226 for engagement of the A/C compressor clutch when the driver first requests air conditioning. Then, when the A/C compressor clutch engages, the torque reserve module 224 may decrease the torque reserve 226 by an amount equal to the estimated load of the A/C compressor clutch.

A target generating module 228 controls the engine actuators by generating target values for the engine actuators. In this regard, the target generating module 228 may be referred to as an engine actuator control module. The target generating module 228 generates target values for the engine actuators based on the propulsion torque request 222, the torque reserve 226, and other parameters as discussed further below. The target generating module 228 generates the target values using model predictive control (MPC). The propulsion torque request 222 may be a brake torque. Brake torque may refer to torque at the crankshaft under the current operating conditions.

The target values include a target wastegate opening area 230, a target throttle opening area 232, a target bypass valve position 233, a target EGR opening area 234, a target intake valve lift state 236, and a target exhaust valve lift state 238. The target values also include a target spark timing 240, a target number 242 of cylinders to be activated, and target fueling parameters 244. The boost actuator module 164 controls the wastegate 162 to achieve the target wastegate opening area 230. For example, a first conversion module 248 may convert the target wastegate opening area 230 into a target duty cycle 250 to be applied to the wastegate 162, and the boost actuator module 164 may apply a signal to the wastegate 162 based on the target duty cycle 250. In various implementations, the first conversion module 248 may convert the target wastegate opening area 230 into a target wastegate position (not shown), and convert the target wastegate position into the target duty cycle 250.

The throttle actuator module 116 controls the throttle valve 112 to achieve the target throttle opening area 232. For example, a second conversion module 252 may convert the target throttle opening area 232 into a target duty cycle 254 to be applied to the throttle valve 112, and the throttle actuator module 116 may apply a signal to the throttle valve 112 based on the target duty cycle 254. In various implementations, the second conversion module 252 may convert the target throttle opening area 232 into a target throttle position (not shown), and convert the target throttle position into the target duty cycle 254. The bypass actuator module 168 controls the bypass valve 166 to achieve the target bypass valve position 233.

The EGR actuator module 172 controls the EGR valve 170 to achieve the target EGR opening area 234. For example, a fourth conversion module 256 may convert the target EGR opening area 234 into a target duty cycle 258 to be applied to the EGR valve 170, and the EGR actuator module 172 may apply a signal to the EGR valve 170 based on the target duty cycle 258. In various implementations, the fourth conversion module 256 may convert the target EGR opening area 234 into a target EGR position (not shown), and convert the target EGR position into the target duty cycle 258.

The valve actuator module 139 controls the intake valve actuator 136 to achieve the target intake valve lift state 236. The valve actuator module 139 also controls the exhaust valve actuator 138 to achieve the target exhaust valve lift state 238. Each of the target intake and exhaust valve lift states 236 and 238 may be one of the first, second, or third lift states discussed above in regards to the possible lift states of the intake and exhaust valve actuators 136 and 138.

The target wastegate opening area 230, the target throttle opening area 232, the target bypass valve position 233, the target EGR opening area 234, the target intake valve lift state 236, and the target exhaust valve lift state 238 may be referred to as air control setpoints. The target throttle opening area 232 may only be used as an air control setpoint if the engine 102 is a spark-ignition engine. Thus, if the engine 102 is a compression-ignition engine, the target throttle opening area 232 may not be used as an air control setpoint. Instead, a target EGR flow, a target boost amount, and/or a target engine air flow may be used as air control setpoints. The target EGR flow, the target boost amount, and/or the target engine air flow may be achieved by adjusting the target wastegate opening area 230, a target variable geometry turbocharger (VGT) position (if applicable), the target EGR opening area 234, the target intake valve lift state 236, and/or the target exhaust valve lift state 238.

The spark actuator module 126 provides spark based on the target spark timing 240. The cylinder actuator module 120 selectively activates and deactivates the valves of cylinders based on the target number 242 of cylinders. Fueling and spark may also be disabled to cylinders that are deactivated. The target fueling parameters 244 may include a target fuel rail pressure, a target number of fuel injections for each combustion event, a target fueling amount for each injection, and/or target start timing for each injection. The fuel actuator module 124 controls fueling based on the target fueling parameters 244. In one example, the fuel actuator module 124 may command a pilot injection, a main injection, a post injection, an exhaust injection, and the target fueling parameters 244 may include a target fueling amount and/or a target start timing for each of the pilot, main, post, and exhaust injections.

Figure 3:
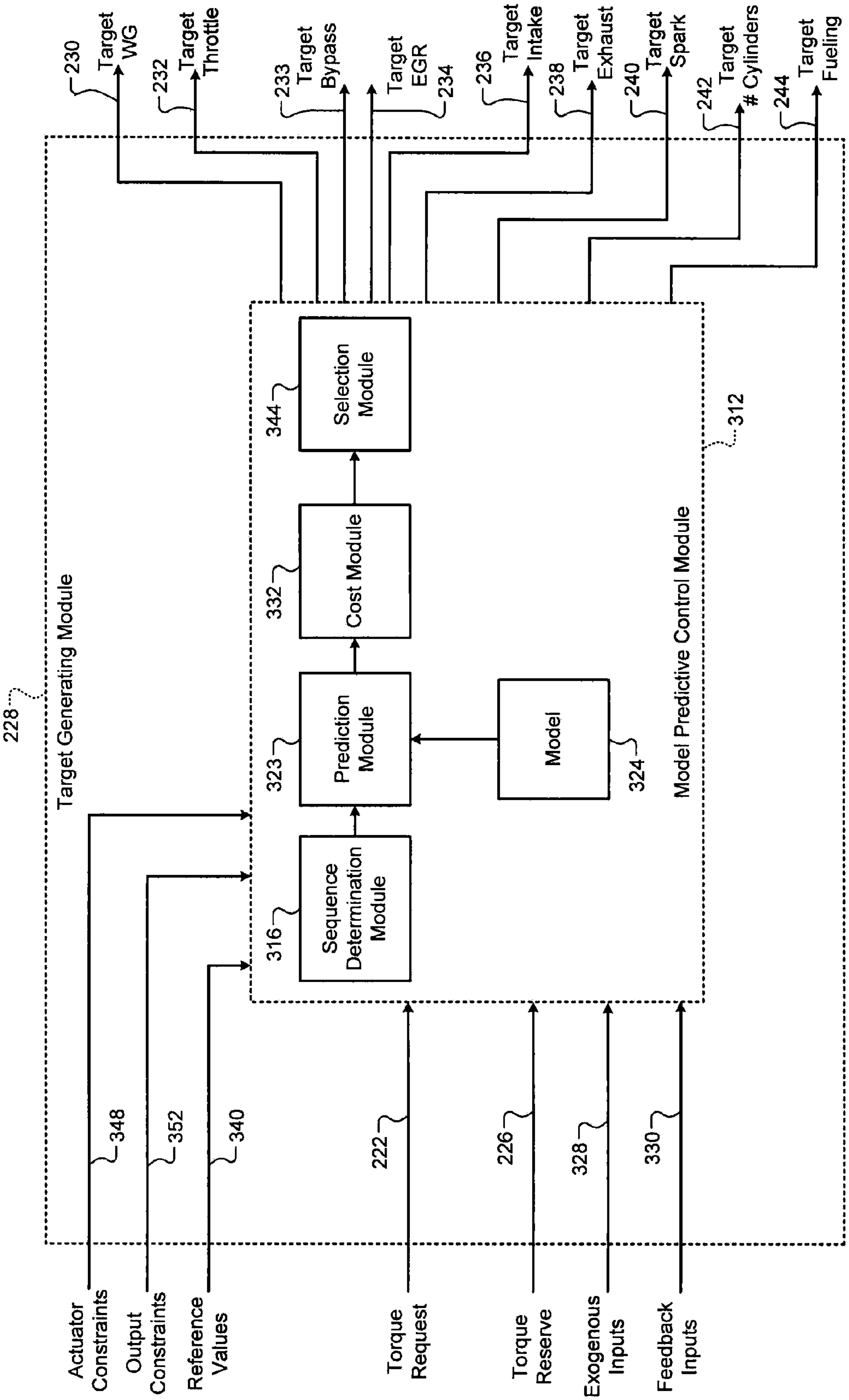
FIG. 3 is a functional block diagram of an example air control module according to the present disclosure.

FIG. 3 is a functional block diagram of an example implementation of the target generating module 228. Referring now to FIGS. 2 and 3, as discussed above with reference to the driver torque module 202, the driver torque request 204 may include a current driver torque request and future driver torque requests. Similarly, the propulsion torque request 222 may include a current propulsion torque request and future propulsion torque requests. The current and future propulsion torque requests may be determined based on the current and future driver torque requests, respectively.

An MPC (model predictive control) module 312 generates the target values 230-244 using MPC. The MPC module 312 may be a single module or may comprise multiple modules. For example, the MPC module 312 may include a sequence determination module 316. The sequence determination module 316 determines possible sequences of the target values 230-244 that could be used together during N future control loops. Each of the possible sequences identified by the sequence determination module 316 includes one sequence of N values for each of the target values 230-244. In other words, each possible sequence includes a sequence of N values for the target wastegate opening area 230, a sequence of N values for the target throttle opening area 232, a sequence of N values for the target bypass valve position 233, a sequence of N values for the target EGR opening area 234, a sequence of N values for the target intake valve lift state 236, and a sequence of N values for the target exhaust valve lift state 238. Each possible sequence also includes a sequence of N values for the target spark timing 240, the target number 242 of cylinders, and the target fueling parameters 244. Each of the N values corresponds to one of the N future control loops. N is an integer greater than one.

A prediction module 323 predicts responses of the engine 102 to the possible sequences of the target values 230-244 based on a mathematical model 324 of the engine 102, exogenous inputs 328, and feedback inputs 330. For example, based on a possible sequence of the target values 230-244, the exogenous inputs 328, and the feedback inputs 330, using the model 324, the prediction module 323 may generate a sequence of predicted torques of the engine 102 for the N control loops, a sequence of predicted MAPs for the N control loops, a sequence of predicted masses of air per cylinder (APCs) for the N control loops, a sequence of predicted amounts of external dilution for the N control loops, a sequence of predicted amounts of internal dilution for the N control loops, a sequence of predicted combustion phasing values for the N control loops, a sequence of predicted combustion quality values for the N control loops, and a sequence of predicted effective displacement values for the N control loops.

The model 324 may include a function or a mapping calibrated based on characteristics of the engine 102. Dilution may refer to an amount of exhaust from a prior combustion event trapped within a cylinder for a combustion event. External dilution may refer to exhaust provided for a combustion event via the EGR valve 170. Internal dilution (also referred to as residual dilution) may refer to exhaust that remains in a cylinder and/or exhaust that is pushed back into the cylinder following the exhaust stroke of a combustion cycle. Effective displacement may refer to the volume of air drawn into cylinders of an engine as pistons in the cylinders travel from TDC to BDC, minus losses in air volume due to pistons pushing air back into an intake manifold through intake valves of the cylinders.

Combustion phasing may refer to a crankshaft position where a predetermined amount of fuel injected is combusted within a cylinder relative to a predetermined crankshaft position for combustion of the predetermined amount of injected fuel. For example, combustion phasing may be expressed in terms of CA50 relative to a predetermined CA50. CA50 may refer to a crankshaft angle (CA) where 50 percent of a mass of injected fuel has been combusted within a cylinder. The predetermined CA50 may correspond to a CA50 where a maximum amount of work is produced from the fuel injected and may be approximately 8.5-approximately 10 degrees after TDC (top dead center) in various implementations. While combustion phasing will be discussed in terms of CA50 values, another suitable parameter indicative of combustion phasing may be used. Additionally, while combustion quality will be discussed as coefficient of variation (COV) of indicated mean effective pressure (IMEP) values, another suitable parameter indicative of combustion quality may be used.

The exogenous inputs 328 may include parameters that are not directly affected by the engine actuators. For example, the exogenous inputs 328 may include engine speed, turbocharger inlet air pressure, IAT, and/or one or more other parameters. The feedback inputs 330 may include, for example, an estimated torque output of the engine 102, an exhaust pressure downstream of the turbine 160-1 of the turbocharger, the IAT, an APC of the engine 102, an estimated internal dilution, an estimated external dilution, MAF, an air/fuel ratio of the engine 102, spark timing, and/or one or more other suitable parameters. The feedback inputs 330 may be measured using sensors (e.g., the IAT sensor 192) and/or estimated based on one or more other parameters.

The prediction module 323 also predicts, for each of the possible sequences of adjustments to the target values 230-246, levels of emissions in exhaust gas produced by the engine 102. The predicted emissions levels may include a level of nitrogen oxide (NOx) in exhaust gas produced by the engine 102, a level of hydrocarbon (HC) in exhaust gas produced by the engine 102, and/or a level of carbon monoxide (CO) in exhaust gas produced by the engine 102. The prediction module 323 may predict the emissions levels based on, for example, the exogenous inputs 328 and/or the feedback inputs 330. The prediction module 323 may make these predictions using linear physics-based models. For example, based on a possible sequence of the target values 266-270, the exogenous inputs 328, and the feedback inputs 330, using the physics-based models, the prediction module 323 may generate a sequence of predicted NOx levels for the N control loops, a sequence of predicted HC levels for the N control loops, and a sequence of predicted CO levels for the N control loops.

A cost module 332 determines a cost value for each of the possible sequences of the target values 230-244 based on the predicted parameters determined for a possible sequence and may determine the cost value based on reference values 340. The cost module 332 may determine the cost value for each of the possible sequences based on relationships between the predicted parameters and corresponding ones of the reference values 340. The relationships may be weighted, for example, to control the effect that each of the relationships has on the cost.

A selection module 344 selects one of the possible sequences of the target values 230-244 based on the respective costs of the possible sequences. For example, the selection module 344 may select the one of the possible sequences having the lowest cost while satisfying actuator constraints 348 and output constraints 352.

In various implementations, satisfaction of the actuator constraints 348 and/or the output constraints 352 may be considered in the cost determination. For example, the cost module 332 may determine the cost value for each of the possible sequences based on relationships between the predicted parameters and corresponding ones of the actuator constraints 348 and the output constraints 352.

The selection module 344 may set the target values 230-244 to the first ones of the N values of the selected possible sequence, respectively. In other words, the selection module 344 sets the target wastegate opening area 230 to the first one of the N values in the sequence of N values for the target wastegate opening area 230, set the target throttle opening area 232 to the first one of the N values in the sequence of N values for the target throttle opening area 232, set the target bypass valve position 233 to the first one of the N values in the sequence of N values for the target bypass valve position 233, set the target EGR opening area 234 to the first one of the N values in the sequence of N values for the target EGR opening area 234, set the target intake valve lift state 236 to the first one of the N values in the sequence of N values for the target intake valve lift state 236, and set the target exhaust valve lift state 238 to the first one of the N values in the sequence of N values for the target exhaust valve lift state 238. The selection module 344 also sets the target spark timing 240 to the first one of the N values in the sequence of N values for the target spark timing 240, the target number 242 of cylinders to the first one of the N values in the sequence of N values for the target number 242 of cylinders, and the target fueling parameters 244 to the first one of the N values in the sequence of N values for the target fueling parameters 244.

During a next control loop, the MPC module 312 identifies possible sequences, generates the predicted parameters for the possible sequences, determines the cost of each of the possible sequences, selects of one of the possible sequences, and sets of the target values 230-244 to the first set of the target values 230-244 in the selected possible sequence. This process continues for each control loop.

An actuator constraint module 360 (see FIG. 2) sets the actuator constraints 348 for each of the target values 230-244. In other words, the actuator constraint module 360 sets actuator constraints for the throttle valve 112, actuator constraints for the EGR valve 170, actuator constraints for the wastegate 162, actuator constraints for the intake valve actuator 136, and actuator constraints for the exhaust valve actuator 138. The actuator constraint module 360 also sets actuator constraints for the spark actuator module 126, actuator constraints for the cylinder actuator module 120, and actuator constraints for the fuel actuator module 124.

The actuator constraints 348 for each of the target values 230-244 may include a maximum value for an associated target value and a minimum value for that target value. The actuator constraint module 360 may generally set the actuator constraints 348 to predetermined operational ranges for the associated engine actuators. More specifically, the actuator constraint module 360 may generally set the actuator constraints 348 to predetermined operational ranges for the throttle valve 112, the EGR valve 170, the wastegate 162, the intake cam phaser 148, the exhaust cam phaser 150, the spark actuator module 126, the cylinder actuator module 120, and the fuel actuator module 124, respectively. Thus, the maximum value for a target value may be a maximum limit of a corresponding actuator and the minimum value for the target value may be a minimum limit of that actuator.

An output constraint module 364 (see FIG. 2) sets the output constraints 352 for the predicted torque output of the engine 102, the predicted MAP, the predicted APC, the predicted CA50, the predicted COV of IMEP, the predicted internal dilution, the predicted external dilution, and/or the predicted effective displacement. The output constraints 352 for each of the predicted parameters may include a maximum value for an associated predicted parameter and a minimum value for that predicted parameter. For example, the output constraints 352 may include a minimum torque, a maximum torque, a minimum MAP, a maximum MAP, a minimum APC, a maximum APC, a minimum CA50, a maximum CA50, a minimum COV of IMEP, a maximum COV of IMEP, a minimum internal dilution, a maximum internal dilution, and a minimum external dilution, a maximum external dilution, a minimum effective displacement, and/or a maximum effective displacement.

The output constraint module 364 may generally set the output constraints 352 to predetermined ranges for the associated predicted parameters, respectively. However, the output constraint module 364 may vary one or more of the output constraints 352 under some circumstances. For example, the output constraint module 364 may retard the maximum CA50, such as when knock occurs within the engine 102. In another example, the output constraint module 364 may increase the maximum COV of IMEP under low load conditions, such as during engine idling where a higher COV of IMEP may be needed to achieve a given torque request.

A reference value module 368 (see FIG. 2) generates the reference values 340 for the target values 230-244. The reference values 340 include a reference for each of the target values 230-244. In other words, the reference values 340 include a reference wastegate opening area, a reference throttle opening area, a reference EGR opening area, a reference intake cam phaser angle, and a reference exhaust cam phaser angle. The reference values 340 also include reference spark timing, a reference number of cylinders, and reference fueling parameters. The reference values 340 may also include a reference for each of the output constraints 352. For example, the reference values 340 may include a reference manifold absolute pressure (MAP), a reference mass of air per cylinder (APC), a reference external dilution, a reference internal dilution, and a reference effective displacement.

The reference value module 368 may determine the reference values 340 based on the propulsion torque request 222. The reference values 340 provide references for setting the target values 266-270. The reference values 340 may be used to determine the cost values for possible sequences, as discussed further below. The reference values 340 may also be used for one or more other reasons, such as by the sequence determination module 316 to determine possible sequences.

Instead of or in addition to generating sequences of possible target values and determining the cost of each of the sequences, the MPC module 312 may identify a sequence of possible target values having the lowest cost using convex optimization techniques. For example, the MPC module 312 may determine the target values 230-244 using a quadratic programming (QP) solver, such as a Dantzig QP solver. In another example, the MPC module 312 may generate a surface of cost values for the possible sequences of the target values 230-244 and, based on the slope of the cost surface, identify a sequence of possible target values having the lowest cost. The MPC module 312 may then test that sequence of possible target values to determine whether that sequence of possible target values satisfies the actuator constraints 348 and the output constraints 352. If so, the MPC module 312 may set the target values 230-244 to the first ones of the N values of that selected possible sequence, respectively, as discussed above.

If the actuator constraints 348 or the output constraints 352 are not satisfied, the MPC module 312 selects another sequence of possible target values with a next lowest cost and tests that sequence of possible target values for satisfaction of the actuator constraints 348 and the output constraints 352. The process of selecting a sequence and testing the sequence for satisfaction of the actuator constraints 348 and the output constraints 352 may be referred to as an iteration. Multiple iterations may be performed during each control loop.

The MPC module 312 performs iterations until a sequence with the lowest cost that satisfies the actuator constraints 348 and the output constraints 352 is identified. In this manner, the MPC module 312 selects the sequence of possible target values having the lowest cost while satisfying the actuator constraints 348 and the output constraints 352. If a sequence cannot be identified, the MPC module 312 may indicate that no solution is available.

The cost module 332 may determine the cost for the possible sequences of the target values 266-270 based on: a relationship between the predicted torque and the propulsion torque request 222; the target fueling amount, and the predicted emissions levels. For example only, the cost module 332 may determine the cost for a possible sequence of the target values 266-270 based on the following relationship:

$$\text{Cost}=\Sigma_{i=1}^{N}[wT_i*\|TP_i-\text{PTR}i\|^2+wF_i*PTFi+wE_iEPi],$$

subject to the actuator constraints 348 and the output constraints 352. Cost is the cost for the possible sequence of the target values 266-270, TPi is the actual torque delivered by the engine 102 for an i-th one of the N control loops, PTRi is a predicted torque request for the i-th one of the N control loops, and wTi is a weighting value for the i-th one of the N control loops. The actual torque delivered by the engine 102 for the i-th one of the N control loops may be predicted based on the predicted torque request for the i-th one of the N control loops. In this regard, the actual torque delivered by the engine 102 may be the predicted torque output generated by the prediction module 323. The predicted torque request for the i-th one of the N control loops may be the propulsion torque request 222 for the i-th one of the N control loops. The propulsion torque request for the first one of the N control loops may be determined based on the current driver torque request determined by the driver torque module 202. The propulsion torque requests for all subsequent ones of the N control loops may be determined based on the future driver torque requests predicted by the driver torque module 202. The weighting value wTi is associated with the difference between the actual torque delivered by the engine 102 for the i-th one of the N control loops and the predicted torque request for the i-th one of the N control loops. The cost increases as the difference between the actual engine torque delivered and the predicted torque request increases and vice versa.

PFi is a possible target fueling amount for the i-th one of the N control loops, and wTFi is a weighting value associated with the possible target fueling amount for the i-th one of the N control loops. The cost increases as the possible target fueling amount increases and vice versa. Thus, the possible target fueling amount may be included in the cost relationship provided above to reduce fuel consumption. In this regard, the possible target fueling amount may be referred to as a fuel consumption term.

EPi is the predicted emissions levels for the i-th one of the N control loops, and wEi is a weighting value associated with the predicted emissions levels for the i-th one of the N control loops. The cost increases as the predicted emissions levels increase and vice versa. Thus, the predicted emissions levels may be included in the cost relationship provided above to reduce emissions.

The weighting value wTi may be greater than the weighting value wFi and the weighting value wEi. In this manner, the relationship between the relationship between the actual engine torque delivered and the predicted torque request may have a larger effect on the cost than the target fueling amount or the predicted emissions levels. Therefore, the relationship between the actual engine torque delivered and the predicted torque request may have a larger effect on the selection of one of the possible sequences relative to the target fueling amount or the predicted emissions levels.

Figure 4:
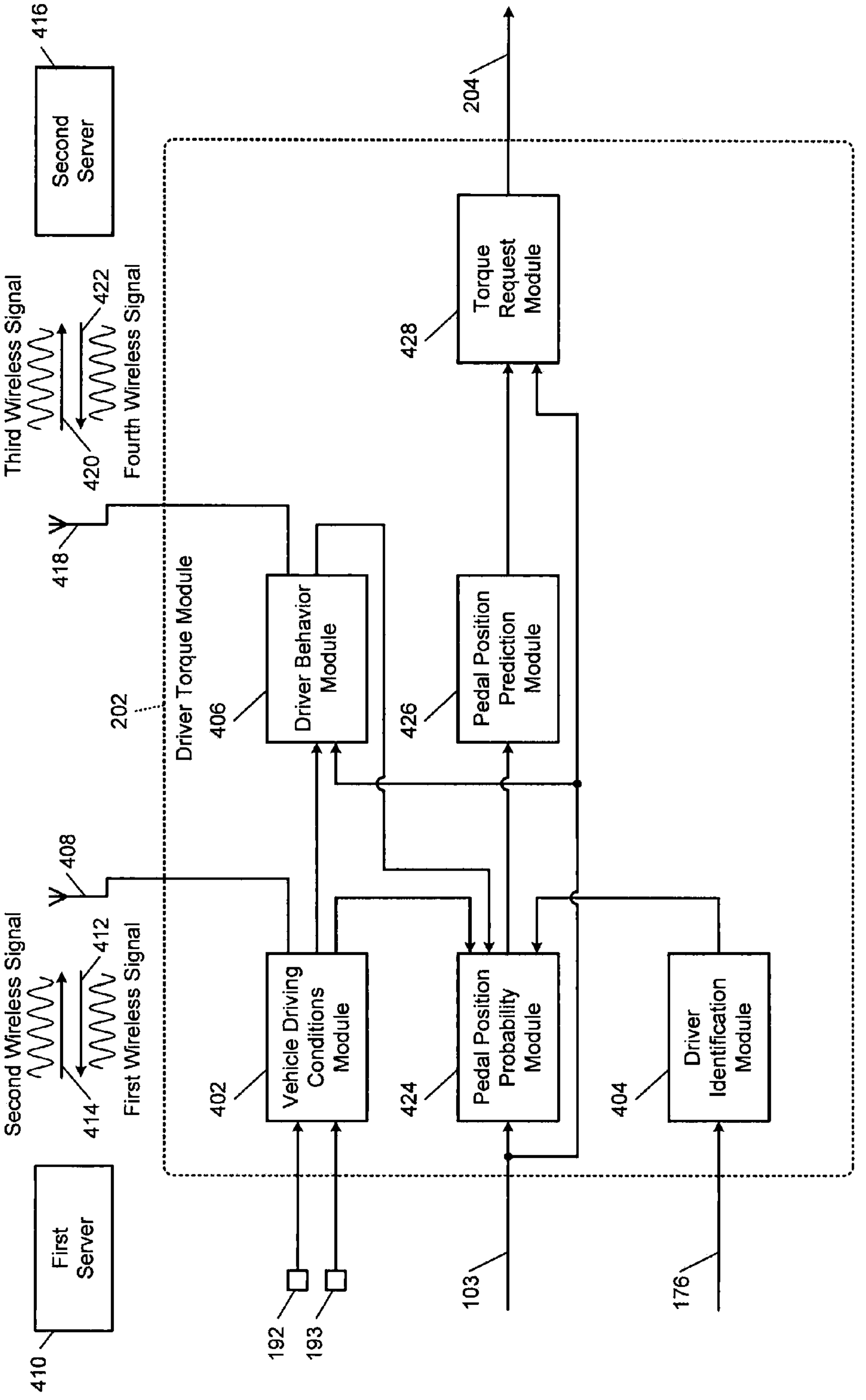
FIG. 4 is a functional block diagram of an example driver torque module according to the present disclosure.

Referring now to FIG. 4, an example implementation of the driver torque module 202 includes a vehicle driving conditions module 402, a driver identification module 404, and a driver behavior module 406. The vehicle driving conditions module 402 determines vehicle driving conditions. The vehicle driving conditions may include a weather condition, current vehicle speed, a speed limit, a traffic condition, a road slope, and/or a road condition. The vehicle driving conditions module 402 may classify each of the vehicle driving conditions, other than the current vehicle speed and the speed limit, into multiple (e.g., 3) categories. For example, the weather condition may be classified as normal, bad, or very bad. The weather condition may be classified as bad when there is snow, rain, and/or fog. The weather condition may be classified as very bad when there is heavy snow, a storm, and/or heavy fog.

In other examples, the traffic condition may be classified as normal, bad, or heavy, the road slope may be classified as normal, less than normal, or greater than normal, and the road condition may be classified as normal or bad. The road condition may be classified as bad when the road on which the vehicle is travelling is slippery or very rocky. The road slope may be classified as normal when the road slope is within a predetermined range. The road slope may be classified as less than normal when the road slope is less than a first predetermined value. The road slope may be classified as greater than normal when the road slope is greater than a second predetermined value. The first predetermined value may be the lowest value in the predetermined range, and the second predetermined value may be the highest value in the predetermined range. Alternatively, the first predetermined value may be less than all of the values in the predetermined range, and the second predetermined value may be greater than all of the values in the predetermined range.

The vehicle driving conditions module 402 may determine the vehicle driving conditions based on one or more signals received from the sensors of FIG. 1. For example, the vehicle driving conditions module 402 may assume that the ambient air temperature is equal to the intake air temperature from the IAT sensor 192, and determine the weather condition based on the ambient temperature. In another example, the vehicle driving conditions module 402 may determine a magnitude and/or frequency of wheel slip based on the wheel speeds from the wheel speed sensors 193, and determine the road condition based on the wheel slip magnitude and/or frequency.

The vehicle driving conditions module 402 may determine the vehicle driving conditions based on one or more signals received from a wireless communication network such as a wireless telephone network and/or a satellite communication network (e.g., OnStar®). In the example shown in FIG. 4, the vehicle driving conditions module 402 communicates with an antenna 408, which enables the vehicle driving conditions module 402 to communicate with a first server 410. The first server 410 may store data related to vehicle driving conditions at various geographic locations. In one example, the antenna 408 transmits a first wireless signal 412 indicating the geographic location of the vehicle, and the server transmits a second wireless signal 414 indicating the vehicle driving conditions at that geographic location. In various implementations, the vehicle driving conditions module 402 may communicate with global positioning system (GPS) satellites using the antenna 408 and determine the geographic location of the vehicle based on information received from the GPS satellites. The vehicle driving conditions module 402 outputs the vehicle driving conditions and/or the classification of the vehicle driving conditions.

The driver identification module 404 identifies the driver of using the driver identification signal 176 and outputs the driver identification. In one of the examples discussed above, the driver identification device 174 includes a camera that generates an image of the driver, and the driver identification device 174 includes image recognition software that identifies the driver based on the image generated. Alternatively, the driver identification signal 176 may simply contain the image of the driver, and the driver identification module 404 may include image recognition software that identifies the driver based on the image.

In another example discussed above, the driver identification device 174 includes a touchscreen that requests the driver to enter their identification by manipulating the touchscreen. In this example, the driver identification module 404 may instruct the driver identification device 174 to prompt the driver for their identification when, for example, the driver enters the vehicle. The driver identification module 404 may determine when the driver enters the vehicle based on an input received from a sensor (not shown) that detects when a door of the vehicle is opened.

In yet another example discussed above, the driver identification device 174 identifies the driver by communicating with the key fob. Alternatively, the driver identification module 404 may identify the driver by communicating with the key fob, and the driver identification device 174 may be omitted. The driver identification module 404 may assume that only one driver uses the key fob, or the key fob may be programmable to associate the driver therewith. The driver identification module 404 may communicate with the key fob using, for example, RF and/or bluetooth signals.

The driver behavior module 406 determines the behavior of the driver based on the driver identification and driver behavior data associated with the driver identification. The driver behavior module 406 may classify the driver behavior into multiple categories such as aggressive, typical, and conservative. The driver behavior data may include a history of the accelerator pedal position from the APP sensor 177 associated with the driver identification and one or more of the vehicle driving conditions. Additionally or alternatively, the driver behavior data may include a history of the brake pedal position from the BPP sensor 178 associated with the driver identification and one or more of the vehicle driving conditions. The driver behavior module 406 outputs the driver behavior, which may include the classification of the driver behavior associated with the driver identification and/or the driver behavior data associated with the driver identification.

The driver behavior may be classified as aggressive, typical, or conservative based on the magnitude and/or frequency of the driver acceleration and/or the driver braking. For example, the driver behavior may be classified as typical when the magnitude and/or frequency of the driver acceleration and/or the driver braking is/are within a predetermined range. The driver behavior may be classified as conservative when the magnitude and/or frequency of the driver acceleration and/or the driver braking is/are less than the predetermined range. The driver behavior may be classified as aggressive when the magnitude and/or frequency of the driver acceleration and/or the driver braking is/are greater than the predetermined range.

Additionally or alternately, the driver behavior may be classified as aggressive, typical, or conservative based on a relationship between (1) the driver acceleration and/or the driver braking, and (2) the vehicle driving conditions. For example, the driver behavior may be classified as aggressive when the driver consistently accelerates while the current vehicle speed is greater than the speed limit. In another example, the predetermined range(s) used to classify the driver behavior may vary depending on the vehicle driving conditions.

The driver behavior module 406 may store the driver behavior data. Alternatively, to save memory and computation costs, the driver behavior module 406 may transmit the driver behavior data and the corresponding driver identification and vehicle driving conditions to a second server 416. The second server 416 may store the driver behavior data, and the driver behavior module 406 may retrieve the driver behavior data when the current driver identification matches the driver identification associated with the driver behavior data. In this regard, the driver behavior module 406 may communicate with an antenna 418 that enables the driver behavior module 406 to communicate with the second server 416. The first and second servers 410 and 416 are separate from the vehicle and therefore may be referred to as remote servers.

In one example, the driver behavior module 406 uses the antenna 418 to transmit a third wireless signal 420 indicating the measured accelerator pedal position, the measured brake pedal position, the driver identification, and the vehicle driving conditions. The second server 416 stores a history of the measured accelerator and brake pedal positions, as well as the driver identification and the vehicle driving conditions associated therewith, and transmits a fourth wireless signal 422 indicating that driver behavior data. The driver behavior module 406 may then retrieve that driver behavior data when the driver identification matches the driver identification associated with the driver identification data, and determine the driver behavior based on the driver behavior data and the current vehicle driving conditions.

The example implementation of the driver torque module 202 shown in FIG. 4 further includes a pedal position probability module 424, a pedal position prediction module 426, and a torque request module 428. The pedal position probability module 424 determines P probabilities of P possible values of a pedal position for each of the N future control loops. The pedal position may include the accelerator pedal position and/or the brake pedal position. The pedal position probability module 424 may determine the probability of a possible value of the pedal position at a future time based on the pedal position at the current time, the driver behavior, and the vehicle driving conditions. The pedal position probability module 424 may do this using a function and/or a mapping that relates current pedal position, driver behavior, and vehicle driving conditions to probability of a possible future pedal position. The pedal position probability module 424 outputs the probabilities of the possible future pedal positions.

In various implementations, the pedal position probability module 424 may develop a model of the driver behavior and use that model to determine the probability of a possible future pedal position. In one example, the model may include the probabilities of various pedal positions in various vehicle driving conditions. The pedal position probability module 424 may determine the probabilities in the model based on the driver behavior data. For example, the pedal position probability module 424 may increase the probability of a pedal position in certain vehicle driving conditions as the number of occurrences of that pedal position in those vehicle driving conditions increases. The pedal position probability module 424 may use interpolation to determine the probability of a pedal position in certain vehicle driving conditions where there are no occurrences of that pedal position in those vehicle driving conditions.

As discussed above, the vehicle driving conditions module 402 and the driver behavior module 406 may classify the vehicle driving conditions and the driver behavior, respectively, into multiple categories. Alternatively, the pedal position probability module 424 may classify the vehicle driving conditions and/or the driver behavior into multiple categories in the manner described above. In addition, the pedal position probability module 424 may determines the P probabilities of the P pedal positions for each of the N control loops based on which one of the multiples categories corresponds to the current vehicle driving conditions and/or the current driver.

In various implementations, the driver behavior module 406 and/or the pedal position probability module 424 may be separate from the vehicle (e.g., in the cloud). In these implementations, the vehicle driving conditions module 402 and the pedal position prediction module 426 may wirelessly communicate with the driver behavior module 406 and/or the pedal position probability module 424 using an antenna (not shown). In addition, the vehicle driving conditions module 402 may be omitted, and the pedal position prediction module 426 may receive the vehicle driving conditions directly from the vehicle sensors and/or the first server 410.

In addition, the pedal position probability module 424 may use one or more predetermined models of driver behavior to determine the probability of a possible future pedal position. For example, the predetermined models may include first, second, and third models that contain the probabilities of various pedal positions in various vehicle conditions for a typical driver, a conservative driver, and an aggressive driver, respectively. The pedal position probability module 424 may select one of the first, second, and third models based on the driver behavior model that matches the behavior of the current driver, and determine the probability of a possible future pedal position using the model selected.

The pedal position prediction module 426 predicts the pedal position for each of the N future control loops based on the P probabilities of the P possible values of the pedal position. For example, the pedal position prediction module 426 may set the predicted pedal position equal to the one of the P possible values having the highest one of the P probabilities. If more than one of the P possible values has the highest one of the P probabilities, the pedal position prediction module 426 may set the predicted pedal position equal to the one of those P possible values that is closest to the current pedal position. The pedal position prediction module 426 outputs the predicted pedal position for each of the N control loops.

The torque request module 428 determines the driver torque request 204. As discussed above, the driver torque request 204 may include a current driver torque request and future driver torque requests. The torque request module 428 may determine the current driver torque request based on a current value of a measured pedal position such as the accelerator pedal position from the APP sensor 177 and/or the brake pedal position from the BPP sensor 178. The torque request module 428 may determine the future driver torque requests based on the predicted pedal positions. For example, the torque request module 428 may determine a future driver torque request for each of the N future control loops based on a corresponding one of the N predicted pedal positions.

Figure 5:
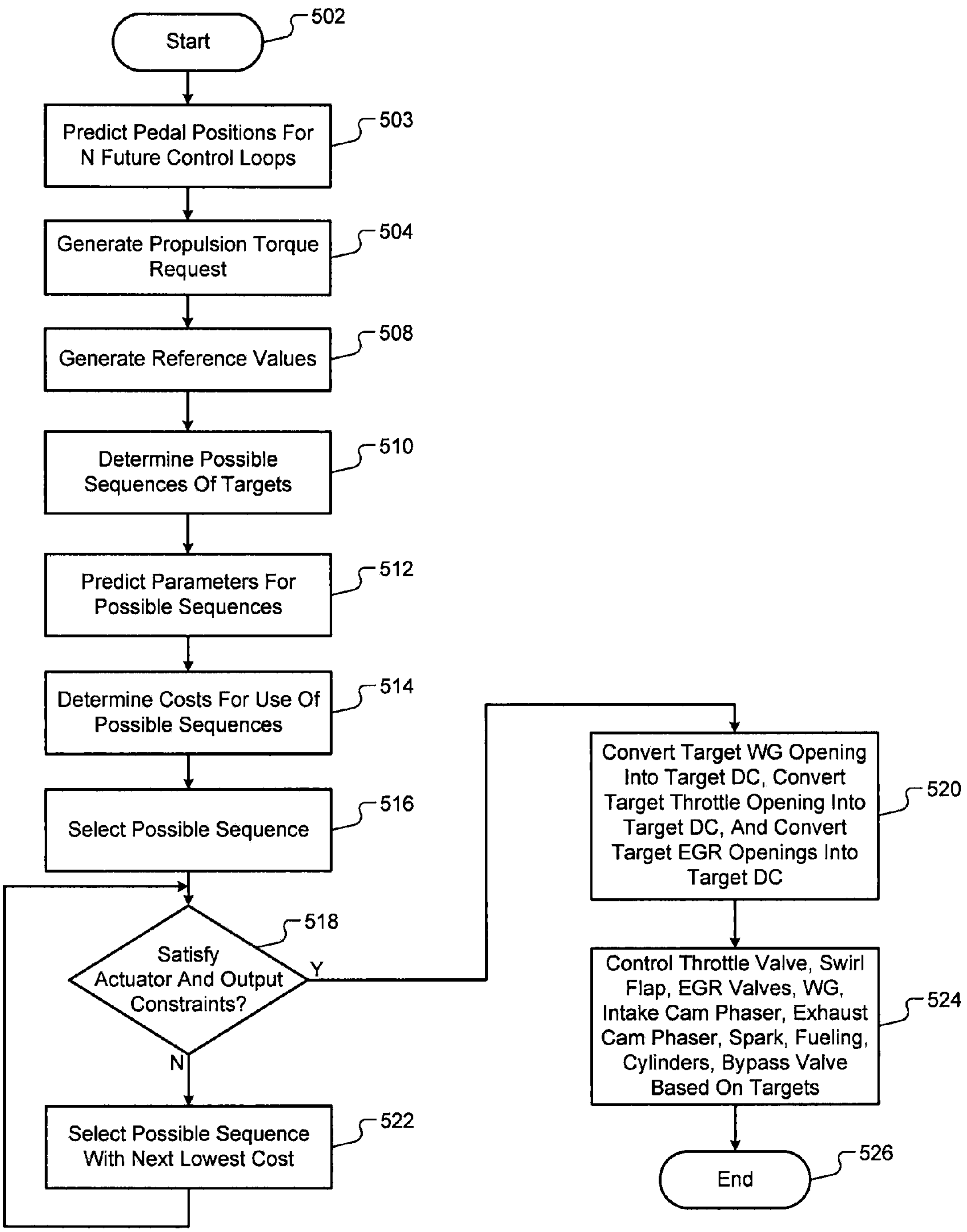
FIG. 5 is a flowchart depicting an example method of controlling an engine actuator using model predictive control according to the present disclosure.

Referring now to FIG. 5, an example method of controlling the throttle valve 112, the intake valve actuator 136, the exhaust valve actuator 138, the wastegate 162 (and therefore the turbocharger), the bypass valve 166, the EGR valve 170, spark timing, fueling, and number of cylinders activated/deactivated using MPC (model predictive control) begins at 502. The method is described in the context of the modules shown in FIGS. 2-4. However, the particular modules that perform the steps of the method may be different than the modules mentioned below and/or the method may be implemented apart from the modules of FIGS. 2-4.

At 503, the pedal position prediction module 426 predicts a pedal position for each of the N future control loops. The pedal position predicted by the pedal position prediction module 426 may include a brake pedal position and/or an accelerator pedal position. As discussed above, the pedal position prediction module 426 may predict the pedal position for each of the N future control loops based on the current pedal position and the vehicle driving conditions.

At 504, the propulsion torque arbitration module 214 determines the propulsion torque request 222. The propulsion torque arbitration module 214 may determine the propulsion torque request 222 for the first one of the N control loops based on the current driver torque request, which may be determined based on the current pedal position. The propulsion torque arbitration module 214 may determine the propulsion torque request 222 for all subsequent ones of the N control loops based on the future driver torque requests, which may be determined based on the predicted pedal positions.

At 508, the reference value module 368 determines the reference values 340. As discussed above, the setpoint module 368 may determine the reference values 340 based on the propulsion torque request 222. At 510, the sequence determination module 316 determines possible sequences of the target values 230-244.

At 512, the prediction module 323 predicts parameters for each of the possible sequences of the target values 230-244. The prediction module 323 predicts the parameters for the possible sequences based on the model 324 of the engine 102, the exogenous inputs 328, and the feedback inputs 330. More specifically, based on a possible sequence of the target values 266-270, the exogenous inputs 328, and the feedback inputs 330, using the model 324, the prediction module 323 generates a sequence of predicted torques of the engine 102 for the N control loops, a sequence of predicted APCs for the N control loops, a sequence of predicted amounts of external dilution for the N control loops, a sequence of predicted amounts of residual dilution for the N control loops, a sequence of predicted combustion phasing values for the N control loops, and a sequence of predicted combustion quality values for the N control loops.

At 514, the cost module 332 determines the costs for the possible sequences of the target values 230-244. For example, the cost module 332 may determine the cost for a possible sequence of the target values 230-244 based on the equation:

$$\text{Cost}=\sum_{i=1}^{N}[wT_i*\|TP_i-BATRi\|^2+wF_i*PTFi+wE_iEPi],$$

subject to the actuator constraints 348 and/or the output constraints 352, as discussed above.

At 516, the selection module 344 selects one of the possible sequences of the target values 230-244 based on the costs of the possible sequences. For example, the selection module 344 may select the one of the possible sequences having the lowest cost. The selection module 344 may therefore select the one of the possible sequences that best achieves the predicted torque request while minimizing the APC. Instead of or in addition to determining possible sequences of the target values 230-244 at 510 and determining the cost of each of the sequences at 514, the MPC module 312 may identify a sequence of possible target values having the lowest cost using convex optimization techniques as discussed above.

At 518, the MPC module 312 determines whether the selected one of the possible sequences satisfies the actuator constraints 348 and the output constraints 352. If the selected one of the possible sequences satisfies the actuator constraints 348 and the output constraints 352, the method continues at 520. Otherwise, the method continues at 522, where the MPC module 312 selects the one of the possible sequences with the next lowest cost. The method then returns to 518. In this manner, the sequence with the lowest cost that satisfies the actuator constraints 348 and the output constraints 352 is used.

At 520, the first conversion module 248 converts the target wastegate opening area 230 into the target duty cycle 250 to be applied to the wastegate 162, the second conversion module 252 converts the target throttle opening area 232 into the target duty cycle 254 to be applied to the throttle valve 112. Also, at 520, the fourth conversion module 256 converts the target EGR opening area 234 into the target duty cycle 258 to be applied to the EGR valve 170.

At 524, the throttle actuator module 116 controls the throttle valve 112 to achieve the target throttle opening area 232. For example, the throttle actuator module 116 may apply a signal to the throttle valve 112 at the target duty cycle 254 to achieve the target throttle opening area 232. Also at 524, the bypass actuator module 168 controls the bypass valve 166 to achieve the target bypass valve position 233, and the valve actuator module 139 controls the intake and exhaust valve actuators 136 and 138 to achieve the target intake and exhaust valve lift states 236 and 238, respectively.

Also at 524, the EGR actuator module 172 controls the EGR valve 170 to achieve the target EGR opening area 234, and the boost actuator module 164 controls the wastegate 162 to achieve the target wastegate opening area 230. For example, the EGR actuator module 172 may apply a signal to the EGR valve 170 at the target duty cycle 258 to achieve the target EGR opening area 234, and the boost actuator module 164 may apply a signal to the wastegate 162 at the target duty cycle 250 to achieve the target wastegate opening area 230. Also at 524, the spark actuator module 126 controls the spark timing based on the target spark timing 240, the cylinder actuator module 120 controls cylinder activation and deactivation based on the target number 242 of cylinders, and the fuel actuator module 124 controls fueling based on the target fueling parameters 244. At 526, the method may end. Alternatively, FIG. 5 may illustrate one control loop, and control loops may be executed at a predetermined rate.

Figure 6:
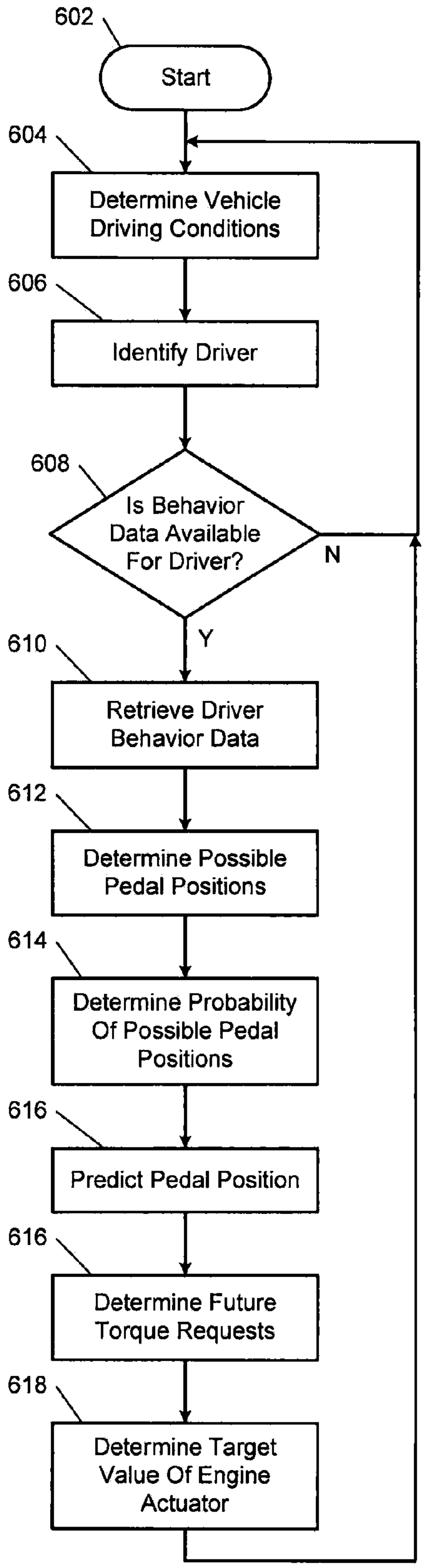
FIG. 6 is a flowchart depicting an example method of predicting a pedal position and determining a target value for an engine actuator based on the predicted pedal position according to the present disclosure.

Referring now to FIG. 6, an example method of predicting a pedal position and determining a target value for an engine actuator based on the predicted pedal position begins at 602. The method is described in the context of the modules shown in FIGS. 3 and 4. However, the particular modules that perform the steps of the method may be different than the modules mentioned below and/or the method may be implemented apart from the modules of FIGS. 3 and 4.

At 604, the vehicle driving conditions module 402 determines the vehicle driving conditions. As discussed above, the vehicle driving conditions may include a weather condition, current vehicle speed, a speed limit, a traffic condition, a road slope, and/or a road condition. In addition, the vehicle driving conditions module 402 may determine the vehicle driving conditions based on signals received from vehicle sensors and/or a wireless communication network.

At 606, the driver identification module 404 identifies the driver of the vehicle. At 608, the driver behavior module 406 determines whether driver behavior data is available for the driver identified. If driver behavior data is available, the method continues at 610. Otherwise, the method returns to 604 and does not predict the pedal position. In the latter case, the method may assume that the propulsion torque request remains constant during the N future control loops.

At 610, the driver behavior module 406 retrieves the driver behavior data. As discussed above, to save memory and computation time, the driver behavior module 406 may transmit the driver behavior data to the second server 416, which may store the driver behavior data. The driver behavior module 406 may then retrieve the driver behavior data when the current driver identification matches the driver identification associated with the driver behavior data.

At 612, the pedal position probability module 424 determines the P possible pedal positions for each of the N future control loops. For example, the pedal position probability module 424 may determine the P possible pedal positions based on the current pedal position and a predetermined range of possible rates of change in pedal position. At 614, the pedal position probability module 424 determines the P probabilities of the P possible pedal positions for each of the N future control loops.

At 616, the pedal position prediction module 426 predicts the pedal position for each of the N future control loops based on the P probabilities of the P possible pedal positions. In one example, the pedal position prediction module 426 sets the predicted pedal position for a future control loop equal to the one of the P possible pedal positions for that control loop which has the highest probability. If more than one of the possible pedal positions has the highest probability, the pedal position prediction module 426 may set the predicted pedal position equal to the one of those possible pedal positions that is closest to the current pedal position.

At 618, the torque request module 428 determines a driver torque request for each of the N future control loops based on the pedal position predicted for that control loop. At 620, the MPC module 312 determines the target values 230-244 based on the future torque requests. For example, the MPC module 312 may determine the cost associated with possible sequences of the target values 230-244 for the N control loops based on differences between the predicted torque output and the future torque request for each of the N control loops. The MPC module 312 may then select the possible sequence of the target values 230-244 that has the lowest cost while satisfying the actuator constraints 348 and the output constraints 352.

Instead of determining a future torque request based on a predicted pedal position and determining a target value for an engine actuator based on the future torque request, a system and method according to the present disclosure may determine the target value based directly on the predicted pedal position. In addition, a system and method according to the present disclosure may determine the target value of the engine actuator based on the predicted pedal position without using MPC. For example, a system and method according to the present disclosure may determine the target value of the engine actuator using a function and/or a mapping that relates predicted pedal positions to target actuator values.

Referring now to FIGS. 7 through 12, an example of how predicting a pedal position can be used to prevent compressor surge will now be described. Compressor surge refers to flow instabilities (e.g., oscillations, aerodynamic stalls) that occur in a compressor. Compressor surge may occur if the outlet pressure of a compressor becomes higher than the compressor can physically maintain at a given mass flow rate. This condition typically happens during tip-outs or gear shifts in gasoline turbocharged direct injection (GTDI) engines. Compressor surge causes undesirable noise, drivability problems, compressor wear and, in extreme cases, mechanical damage.

A system and method according to the present disclosure prevents compressor surge by controlling the wastegate 162 and/or the bypass valve 166 to avoid operating the compressor 160-2 in a surge region where compressor surge is likely to occur. In one example, the system and method opens the wategate 162 to avoid increasing compressor outlet pressure to a high level and thereby prevent compressor surge. In another example, the system and method opens the bypass valve 166 to relieve high compressor outlet pressure and thereby prevent compressor surge. In yet another example, the system and method determines the target bypass valve position 233 based on the mass flow rate of airflow through the compressor 160-2 and pressure downstream of the compressor 160-2 to avoid operating the compressor 160-2 in the surge region.

In yet another example, the system and method determines the reference wastegate opening area based on the compressor mass flow and the post compressor pressure to avoid the surge region. The system and method then determines the cost of possible sequences of the target values 230-244 for N future control loops based on a difference between the target wastegate opening area 230 and the reference wastegate opening area. Thus, the cost increases as the difference between the target wastegate opening area 230 and the reference wastegate opening area increases and vice versa.

In yet another example, the system and method determines the reference bypass valve position based on the compressor mass flow and the post compressor pressure to avoid the surge region. The system and method then determines the cost of possible sequences of the target values 230-244 for N future control loops based on a difference between the target bypass valve position 233 and the reference bypass valve position. Thus, the cost increases as the difference between the target bypass valve position 233 and the reference bypass valve position increases and vice versa.

Figure 7:
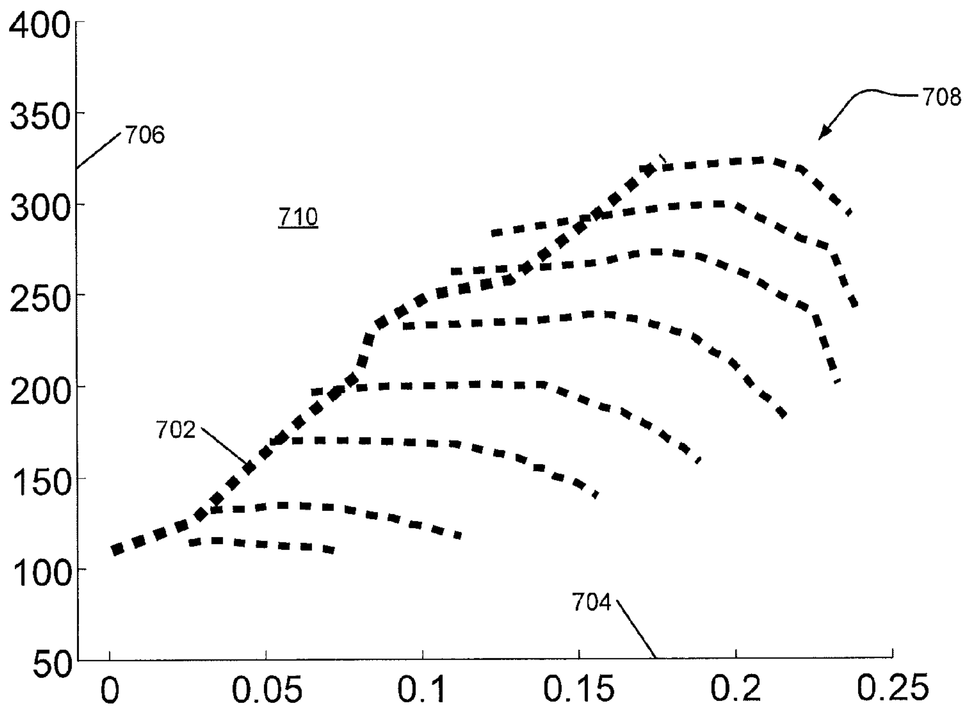
FIG. 7 is a graph illustrating ranges for compressor mass flow and post compressor pressure where compressor surge is possible.

In FIG. 7, a surge boundary 702 is plotted with respect to an x-axis 704 representing compressor mass flow in kilograms per second (kg/s) and a y-axis 706 representing post compressor pressure in kilopascals (kPa). Measured traces 708 are also plotted with respect to the x-axis 704 and the 7-axis 706. The surge boundary 702 defines a surge region 710 where compressor surge is likely to occur. More specifically, the surge region 710 is defined as the area to the left of the surge boundary 702. Thus, a system and method according to the present disclosure may adjust the target wastegate opening area 230 and/or the target bypass valve position 233 to avoid operating the compressor 160-2 in the surge region 710.

Figure 8:
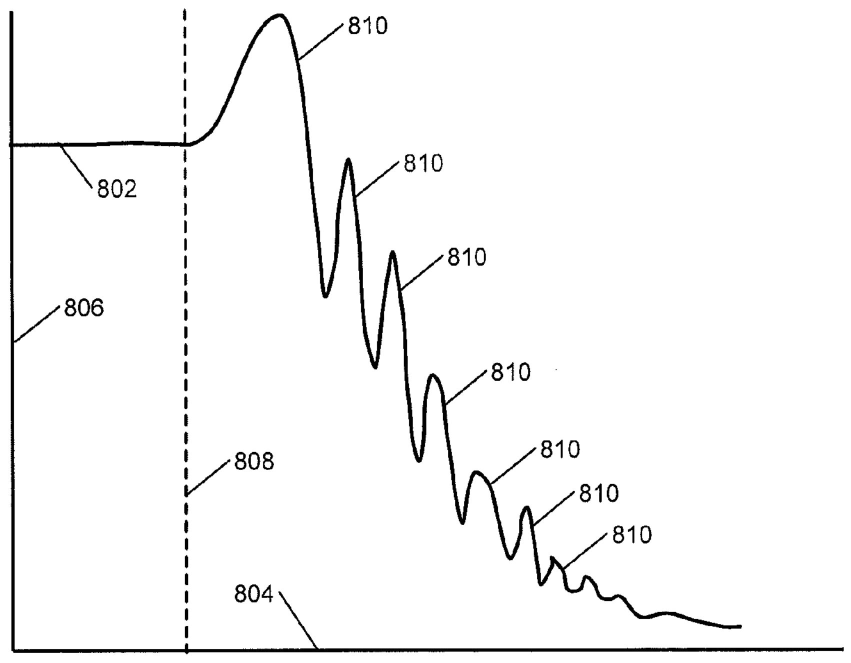
FIG. 8 is a graph illustrating compressor outlet pressure oscillations during tip-out surge.

FIG. 8 shows a compressor outlet pressure 802 plotted with respect to an x-axis 804 representing time and a y-axis 806 representing outlet pressure. At 808, compressor surge starts to occur, as evidenced by oscillations 810 in the compressor outlet pressure 802. The oscillations 810 may lead to undesirable noise as discussed above.

Figure 9:
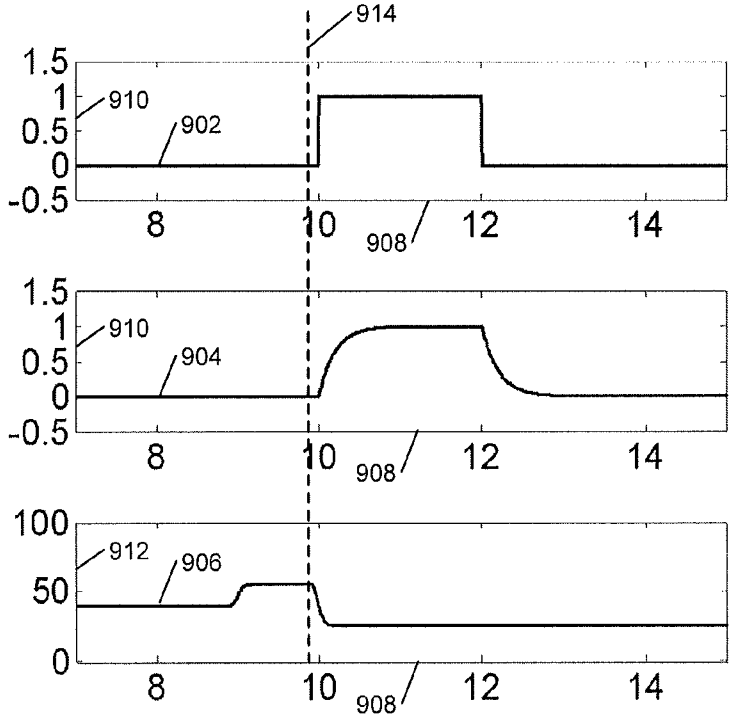
FIGS. 9 and 10 illustrate example controls signals and a corresponding relationship between compressor mass flow and post compressor pressure when controlling a compressor bypass valve based on an actual pedal position.

FIG. 9 shows a target compressor bypass valve position 902, an actual compressor bypass valve position 904, and a target throttle opening 906 that are not determined based on a predicted pedal position. Each of the target compressor bypass valve position 902, the actual compressor bypass valve position 904, and the target throttle opening 906 is plotted with respect to an x-axis 908 that represents time. In addition, the target compressor bypass valve position 902 and the actual compressor bypass valve position 904 are plotted with respect to a y-axis 910 that represents compressor bypass valve position. In the y-axis 910, a value of 0 corresponds to a fully closed position, and a value of 1 corresponds to a fully open position. Further, the target throttle opening 906 is plotted with respect to a y-axis 912 that represents throttle opening in degrees.

A system and method may open a compressor bypass valve before a throttle is fully or substantially closed in order to prevent compressor surge. The throttle opening is typically determined based on an accelerator pedal position. However, the target compressor bypass valve position 902 and the target throttle opening 906 are not determined based on a predicted pedal position. Thus, a system and method that generates the signals shown in FIG. 9 cannot react to the throttle closing before the throttle starts to close.

The situation described above is illustrated at 914. At 914, the system and method starts to decrease the target throttle opening 906. Thus, shortly thereafter, the system and method starts to adjust the target compressor bypass valve position 902 from the fully closed position to the fully open position. In turn, the actual compressor bypass valve position 904 starts to move from the fully closed position to the fully open position. However, the compressor outlet pressure is not relieved fast enough to prevent compressor surge.

Figure 10:
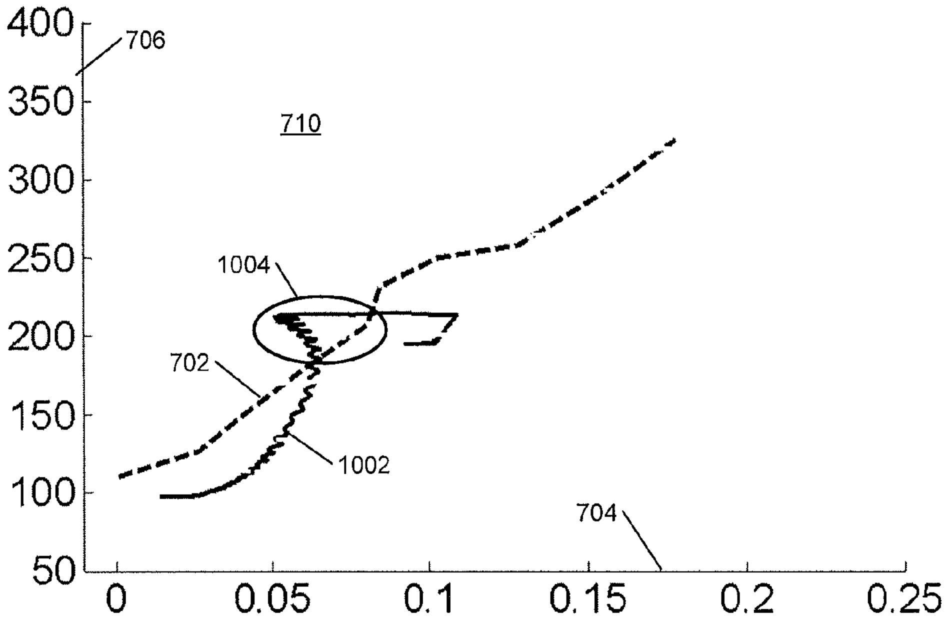

FIG. 10 shows a measured trace 1002 that corresponds to the signals shown in FIG. 9. At 1004, the measured trace 1002 crosses the surge boundary 702 and enters the surge region 710. Thus, FIG. 10 shows that the signals of FIG. 9 are likely to result in compressor surge.

Figure 11:
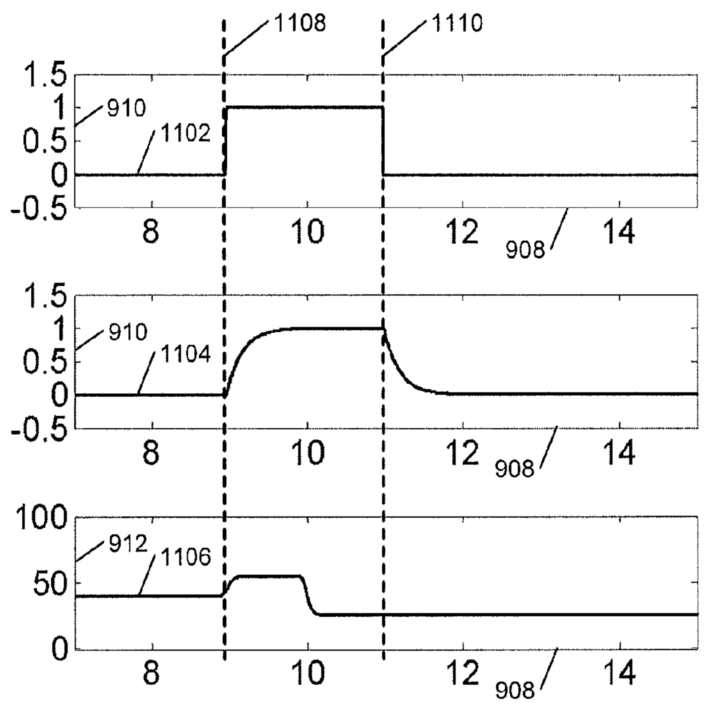
FIGS. 11 and 12 illustrate example controls signals and a corresponding relationship between compressor mass flow and post compressor pressure when controlling a compressor bypass valve based on a predicted pedal position.

FIG. 11 shows a target compressor bypass valve position 1102, an actual compressor bypass valve position 1104, and a target throttle opening 1106 that are determined based on a predicted pedal position. Each of the target compressor bypass valve position 1102, the actual compressor bypass valve position 1104, and the target throttle opening 1106 is plotted with respect to the x-axis 908 that represents time. In addition, the target compressor bypass valve position 902 and the actual compressor bypass valve position 904 are plotted with respect to the y-axis 910, and the target throttle opening 906 is plotted with respect to the y-axis 912.

A system and method that generates the signals shown in FIG. 11 anticipates when the throttle is about to close based on a predicted pedal position. In response, at 1108, the system and method starts to adjust the target compressor bypass valve position 902 from the fully closed position to the fully open position before starting to close the target throttle opening 1106 at 1110. As a result, the compressor outlet pressure is relieved before compressor surge occurs.

Figure 12:
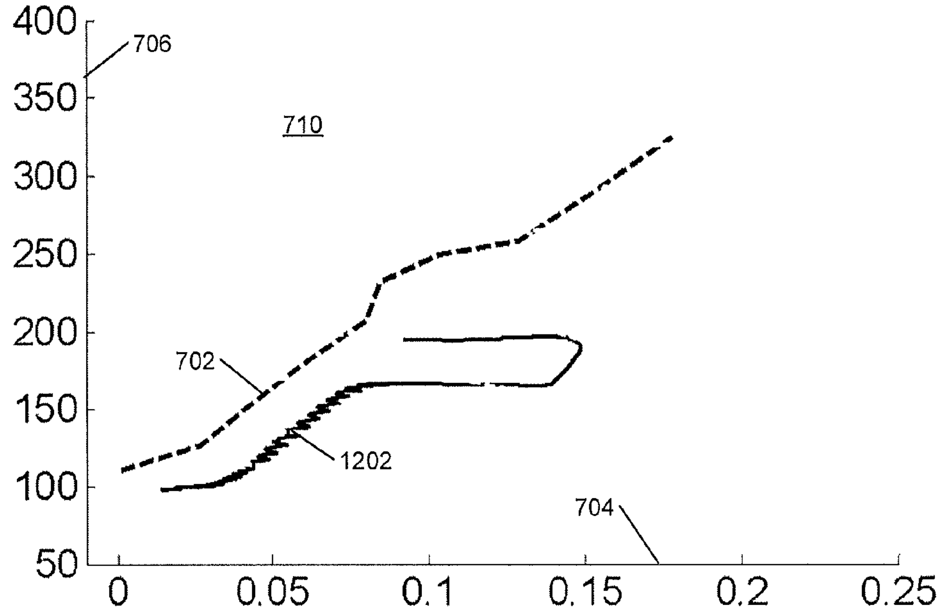

FIG. 12 shows a measured trace 1202 that corresponds to the signals shown in FIG. 11. At 1004, the measured trace 1202 does not cross the surge boundary 702 or enter the surge region 710. Thus, FIG. 12 shows that the signals of FIG. 11 are likely to prevent compressor surge. While the system and method is described above as adjusting a target compressor bypass valve position, the system and method may additionally or alternatively adjust a target wastegate opening area in a similar manner. In other words, the system and method may adjust the target wastegate opening area from its fully closed position to its fully open position before starting to close the target throttle opening in order to prevent compressor surge.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:

a pedal position prediction module that predicts a pedal position at a future time based on driver behavior, vehicle driving conditions, and the pedal position at a current time, wherein the pedal position includes at least one of an accelerator pedal position and a brake pedal position;

an engine actuator control module that controls an actuator of an engine based on the predicted pedal position; and a pedal position probability module that determines P probabilities of P possible nonzero values of the pedal position at the future time based on the pedal position at the current time, the driver behavior, and the vehicle driving conditions, wherein:

the pedal position prediction module sets the predicted pedal position equal to one of the P possible nonzero values of the pedal position corresponding to a highest one of the P probabilities; and P is an integer greater than one.

2. The system of claim 1 further comprising a driver identification module that identifies a driver of a vehicle, wherein the pedal position prediction module determines the driver behavior based on the driver identification.

3. The system of claim 2 further comprising a driver behavior module that transmits driver behavior data associated with the driver identification to a remote server and retrieves the driver behavior data from the remote server based on the driver identification, wherein the pedal position prediction module determines the driver behavior based on the driver identification and the driver behavior data.

4. The system of claim 1 wherein the vehicle driving conditions include at least one of a weather condition, a speed limit, a traffic condition, a road slope, and a road condition.

5. The system of claim 1 further comprising a vehicle driving conditions module that determines the vehicle driving conditions based a signal received from at least one of a vehicle sensor and a wireless communication network.

6. The system of claim 1 wherein the pedal position probability module:

classifies at least one of the vehicle driving conditions into multiple categories; and determines the P probabilities of the P possible nonzero values of the pedal position based on which one of the multiple categories corresponds to actual vehicle driving conditions.

7. The system of claim 1 wherein:

the engine actuator control module determines a target value for the actuator of the engine based on the predicted pedal position; and the target value includes at least one of a target throttle opening area, a target spark timing, a target exhaust gas recirculation (EGR) opening area, a target bypass valve position, a target wastegate position, and a target valve lift position.

8. The system of claim 1 further comprising a model predictive control (MPC) module that:

generates a set of possible target values for the actuator of the engine;

predicts an operating parameter of the engine for each of the possible target values based on the predicted pedal position;

determines a cost for the set of possible target values based on the predicted operating parameter;

selects the set of possible target values from multiple sets of possible target values based on the cost; and sets target values to the possible target values, wherein the engine actuator control module controls the actuator of the engine based on at least one of the target values.

9. A method comprising:

predicting a pedal position at a future time based on driver behavior, vehicle driving conditions, and the pedal position at a current time, wherein the pedal position includes at least one of an accelerator pedal position and a brake pedal position;

controlling an actuator of an engine based on the predicted pedal position;

determining P probabilities of P possible nonzero values of the pedal position at the future time based on the pedal position at the current time, the driver behavior, and the vehicle driving conditions; and setting the predicted pedal position equal to one of the P possible nonzero values of the pedal position corresponding to a highest one of the P probabilities, wherein P is an integer greater than one.

10. The method of claim 9 further comprising:

identifying a driver of a vehicle; and determining the driver behavior based on the driver identification.

11. The method of claim 10 further comprising:

transmitting driver behavior data associated with the driver identification to a remote server and retrieving the driver behavior data from the remote server based on the driver identification; and determining the driver behavior based on the driver identification and the driver behavior data.

12. The method of claim 9 wherein the vehicle driving conditions include at least one of a weather condition, a speed limit, a traffic condition, a road slope, and a road condition.

13. The method of claim 9 further comprising determining the vehicle driving conditions based a signal received from at least one of a vehicle sensor and a wireless communication network.

14. The method of claim 9 further comprising:

classifying at least one of the vehicle driving conditions into multiple categories; and determining the P probabilities of the P possible nonzero values of the pedal position based on which one of the multiple categories corresponds to actual vehicle driving conditions.

15. The method of claim 9 further comprising determining a target value for the actuator of the engine based on the predicted pedal position, wherein the target value includes at least one of a target throttle opening area, a target spark timing, a target exhaust gas recirculation (EGR) opening area, a target bypass valve position, a target wastegate position, and a target valve lift position.

16. The method of claim 9 further comprising:

generating a set of possible target values for the actuator of the engine;

predicting an operating parameter of the engine for each of the possible target values based on the predicted pedal position;

determining a cost for the set of possible target values based on the predicted operating parameter;

selecting the set of possible target values from multiple sets of possible target values based on the cost;

setting target values to the possible target values; and controlling the actuator of the engine based on at least one of the target values.

17. The system of claim 1 wherein, if more than one of the P possible nonzero values of the pedal position corresponds to the highest one of the P probabilities, the pedal position prediction module sets the predicted pedal position equal to the one of those P possible nonzero values that is closest to the pedal position at the current time.

18. The system of claim 6 wherein the vehicle driving conditions include at least one of a weather condition, a speed limit, a traffic condition, a road slope, and a road condition.

19. The method of claim 9 further comprising, if more than one of the P possible nonzero values of the pedal position corresponds to the highest one of the P probabilities, setting the predicted pedal position equal to the one of those P possible nonzero values that is closest to the pedal position at the current time.

20. The method of claim 14 wherein the vehicle driving conditions include at least one of a weather condition, a speed limit, a traffic condition, a road slope, and a road condition.

* * * * *